(12) United States Patent
Rothenberg

(10) Patent No.: US 7,280,571 B2
(45) Date of Patent: Oct. 9, 2007

(54) SCALABLE ZIG-ZAG LASER AMPLIFIER

(75) Inventor: Joshua E. Rothenberg, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 324 days.

(21) Appl. No.: 10/997,415

(22) Filed: Nov. 23, 2004

(65) Prior Publication Data

US 2006/0109878 A1    May 25, 2006

(51) Int. Cl.
*H01S 3/04* (2006.01)
(52) U.S. Cl. .......................... 372/35; 372/70
(58) Field of Classification Search .............. 372/35, 372/70
See application file for complete search history.

(56) References Cited

U.S. PATENT DOCUMENTS

| | | | |
|---|---|---|---|
| 4,697,271 A | | 9/1987 | Amano |
| 4,881,233 A | | 11/1989 | von Arb et al. |
| 5,210,768 A | * | 5/1993 | Seguin ..................... 372/92 |
| 5,555,254 A | | 9/1996 | Injeyan et al. |
| 5,640,406 A | | 6/1997 | Injeyan et al. |
| 5,646,773 A | | 7/1997 | Injeyan et al. |
| 6,034,997 A | | 3/2000 | MacKenthum |
| 6,094,297 A | | 7/2000 | Injeyan et al. |
| 6,178,040 B1 | * | 1/2001 | Injeyan et al. .............. 359/346 |
| 6,256,142 B1 | | 7/2001 | Injeyan et al. |
| 6,268,956 B1 | * | 7/2001 | Injeyan et al. .............. 359/345 |
| 6,404,784 B2 | | 6/2002 | Komine |
| 2002/0118718 A1 | | 8/2002 | Honea |

FOREIGN PATENT DOCUMENTS

| | | |
|---|---|---|
| EP | 0 994 542 A1 | 4/2000 |
| EP | 1 160 940 A1 | 12/2001 |
| WO | WO 03/047052 A2 | 6/2003 |

* cited by examiner

*Primary Examiner*—Dung (Michael) T. Nguyen
(74) *Attorney, Agent, or Firm*—Carman B. Patti & Assoc., LLC

(57) ABSTRACT

A solid state laser amplifier architecture in which multiple zig-zag slab laser amplifiers (50) are stacked together, side-pumped using a common pump source (52, 54), and cooled with a common cooling system. The stack of zig-zag slabs (50) produces an array of sub-beams (62) that can be combined coherently into a single composite output beam. Variations in pump power absorption through the stack are mitigated by selection of doping levels for the slabs (50). The composite output beam is sufficiently symmetrical to be directed through conventional optics of circular cross section. Multiple stacks may be arranged in a two-dimensional array to obtain even higher output powers.

26 Claims, 17 Drawing Sheets

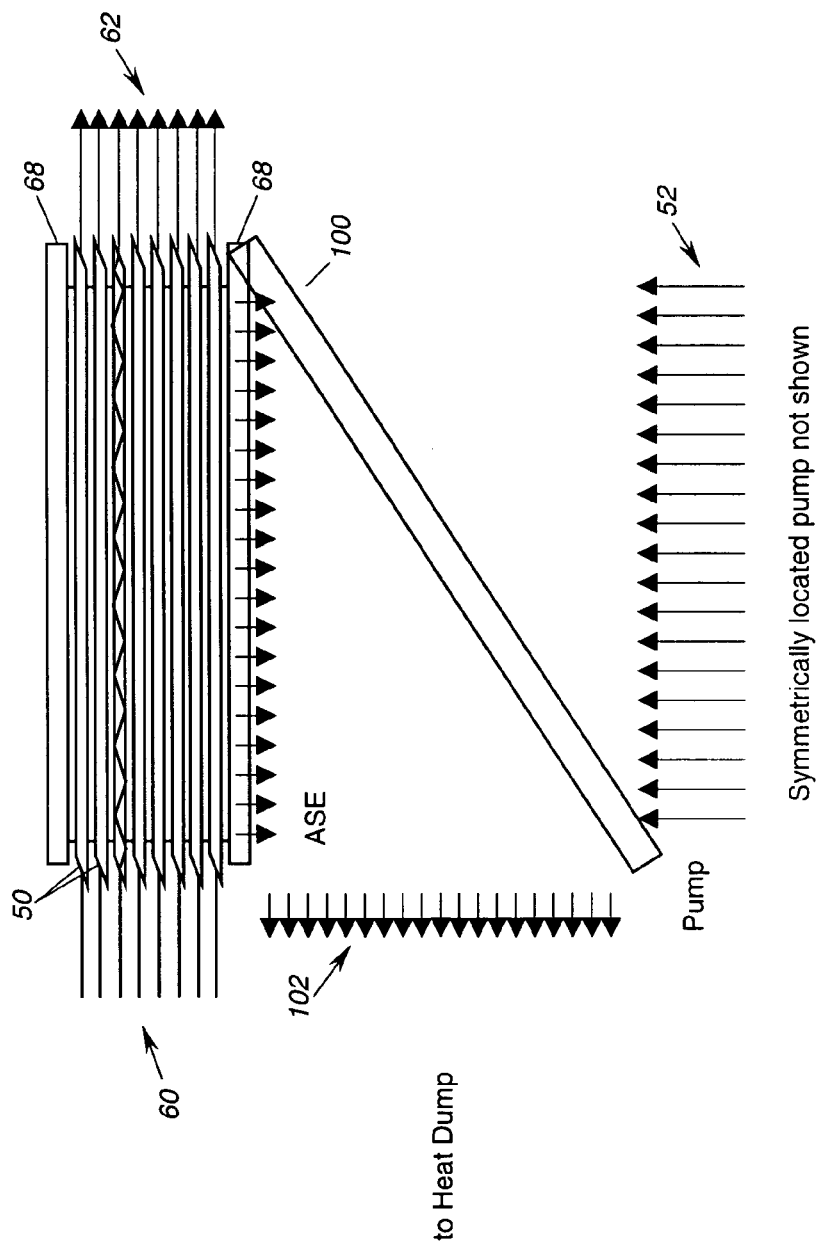

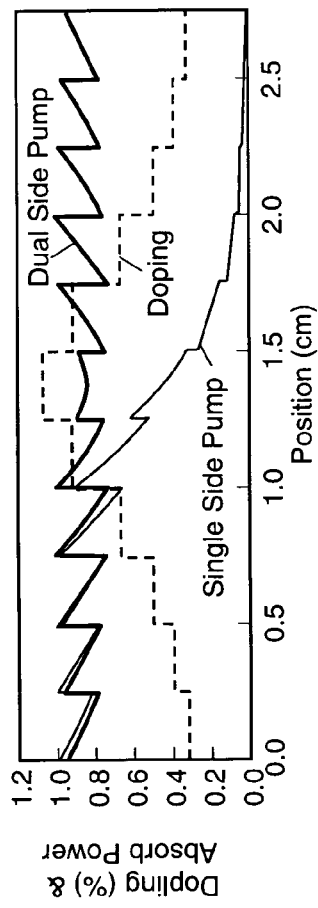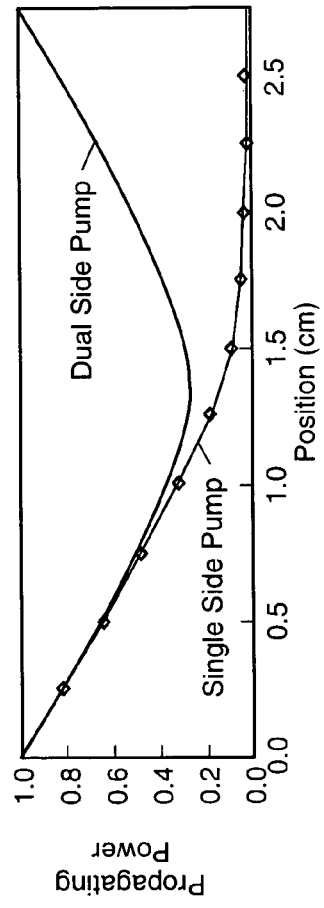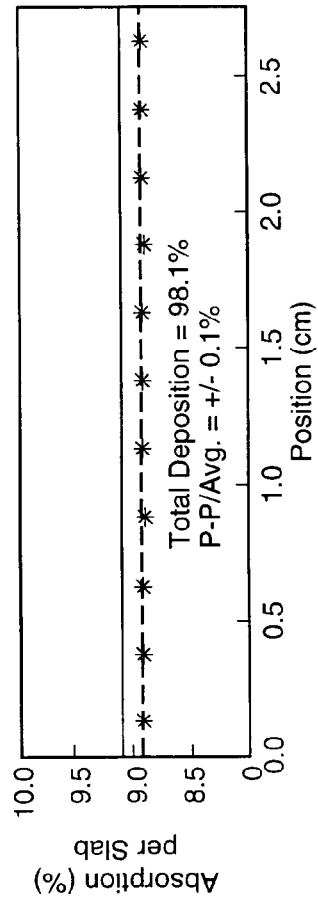

SCALABLE ZIG-ZAG LASER AMPLIFIER

BACKGROUND OF THE INVENTION

This invention relates generally to high power solid state lasers and, more particularly, to solid state laser amplifiers of the zig-zag type, in which a light beam is confined laterally in a solid state slab of doped material, and is subject to repeated internal reflections from parallel faces of the slab. A zig-zag laser amplifier of the prior art is exemplified by the one disclosed in U.S. Pat. No. 6,094,297, to Injeyan et al., entitled "End Pumped Zig-Zag Slab Laser Gain Medium."

In the configuration described in U.S. Pat. No. 6,094,297, a slab of solid state lasing material employs end pumping, which is to say that a pump beam is launched into one or both ends for the slab, and a relatively high overall efficiency is attained by passing the amplified light through the slab in a zig-zag manner. The pump energy is launched into the slab as a narrow beam that passes through one of the parallel faces of the slab and reflects from an end face angled at 45° to the parallel faces. The light to be amplified is launched into the slab through one of the end faces and is internally reflected back from the parallel faces as it progresses along the slab and absorbs energy from the pump beam.

As shown in more detail in FIG. 1, a zig-zag optical amplifier of the prior art is generally identified with the reference numeral 20. The optical amplifier 20 utilizes end pumping, which means that pumped light is generally co-aligned with the amplified light along a longitudinal axis of the slab, resulting in a relatively long absorption length, and thus providing relatively high overall efficiencies. Typically, the configuration is particularly suitable for optical amplifiers that utilize solid state lasing material with relatively low absorption coefficients, such as those materials using neodymium (Nd), ytterbium (Yb), and thulium (Tm) as dopants. The absorption of the pumped light may be confined to a central region of the slab to reduce heating and possible optical distortions at opposing ends of the slab.

More specifically, the optical amplifier 20 of the prior art includes an elongated slab 22 and a pair of pumped beam sources 21 and 26. The elongated slab 22 is formed with a generally rectangular or square cross section defining a pair of opposing end faces 28 and 30 and four lateral faces 32. A longitudinal or lasing axis 34 is defined as an axis generally parallel to the lateral faces 32 and extending between the opposing end faces 28 and 30. A major axis is defined as a horizontal axis in the direction of the zig-zag pattern while a minor axis is defined to be a vertical axis generally perpendicular to the major axis. Both the major and minor axis are perpendicular to the longitudinal axis. The FIG. 1 view is generally considered as a top plan view, in the direction of the minor axis.

The slab 22 may be formed from a solid state lasing material with a relatively high index of refraction to cause internal reflection of the input beam in a generally zig-zag pattern as illustrated in FIG. 1, forming a so called zig-zag amplifier. Such zig-zag amplifiers are known to allow brightness scaling by allowing the input beam to average thermal gradients in the slab, effectively providing a homogeneous gain medium. In order to reduce heating of the ends of the slab 22, the slab may be formed as a diffusion bonded composite material. More particularly, along the longitudinal axis 34 of the slab 22, the opposing end portions 34 and 36 of the slab 22 can be formed from undoped host materials, such as yttrium-aluminum-garnet (YAG). These end portions 34 and 36 can be diffusion bonded to a central portion 38 of the slab 22 formed from a doped host material, such as Nd or Yb doped YAG (Nd:YAG or Yb:YAG), forming two diffusion bond interfaces 40 and 42. Such a configuration limits the absorption length to the center portion 38 of the slab 22. By limiting the absorption length to the center portion 38 of the slab 22, heat generated by the optical pumping is generally confined to the center portion and away from the end portions 34 and 36, which may not have cooling and are thus susceptible to thermal distortion. As mentioned, above, the pumped light is reflected through the slab 22. The pump beams 21 and 26 may enter opposing lateral faces 32 of the slab 22 at opposing end portions 34 and 36, respectively, as generally shown in FIG. 1. In order to enable the light into the slab 22, one or more footprints or windows 41 and 43 may be formed on opposing end portions 34 and 36. The windows 41 and 43 may be formed by way of a coating, such as an antireflection coating selected for the wavelength of the pump beams 21 and 26. As also shown in FIG. 1, the antireflection coating is disposed on the lateral face 32 as well as the opposing end faces 28 and 30, thereby reducing losses of the input beam and pump beam. The pump beams 21 and 26 are directed to opposing lateral faces 32 at opposing end portions 34 and 36 of the slab 32. The pump beams 21 and 26 are totally reflected from the opposing end faces 28 and 30 so that the pump beams are co-aligned with the longitudinal axis 34. By utilizing the composite slab 22 as discussed above, the absorption length of the slab 22 is limited to the central portion 28.

An input light beam 44 is directed into one end face 28 at a relatively small angle, for example, less than 20° relative to the normal of the end face. By proper selection of the angle of incidence of the input beam 44 and selecting a material having a relatively high index of refraction, the input beam is totally reflected along the slab 22 in the generally zig-zag pattern as shown and is out coupled as an amplified beam 46, through the opposing end face 30. The zig-zag pattern across the slab temperature gradients, combined with uniform pumping by the guided diode light and insulated slab edge, results in relatively low thermal lensing with virtually no birefringence.

The laser amplifier of FIG. 1 is relatively efficient in terms of its utilization of pump beams co-aligned with the optical axis of the slab 22, and provides an output with good beam quality and polarization properties. However, the total output power of this device is limited by its small cross sectional area, which is in turn limited by the need to keep the slab thickness small (a few millimeters) to provide adequate removal of residual heat deposited in the slab. Coherent scaling of multiple amplifiers of this type would require many such slabs to reach very high powers. Consequently, the size, weight, complexity, and cost of such a system would be excessive for many applications.

In the end-pumped zig-zag amplifier of FIG. 1, the beam to be amplified and injected from one end experiences total internal reflection (TIR) alternately at the faces of the slab. In the prior art the slab faces are coated with an 'evanescent wave coating,' as described in U.S. Pat. No. 4,881,233. This is a uniform film deposited on the slab surface that has an index lower than the slab material. The amplified beam's field decays exponentially in the evanescent coating such that there is negligible field present at the coating surface. Conduction, liquid, or other cooling can then be applied to the coated slab surfaces to remove excess heat from the slab without impacting the optical performance. Temperature gradients that form within the slab can induce refractive index nonuniformities and birefringence. However, the alternate traversals (zig-zags) of the beam tend to average out these effects and maintain both good beam quality; i.e., uniform optical path difference (referred to as OPD) and polarization purity. The temperature variation in the slab, and therefore the amount of OPD and birefringence, can be minimized by keeping the slab thickness small. In the device of U.S. Pat. No. 6,094,297, as illustrated in FIG. 1, rather than side pumping through a thin slab, end pumping was utilized to achieve an adequate path length and absorption of the pump light, and the lateral faces could then be cooled with an opaque solid conductive cooler. When such a slab amplifier is operated as part of a MOPA (Master Oscillator Power Amplifier) architecture, many amplified beams can be coherently phased and combined by use of prior art techniques, for example as described in U.S. Pat. Nos. 6,404,784 and 6,219,360. This approach, however, suffers from large volume and weight requirements, when scaled to incorporate many slabs.

To minimize size and weight, one ideally would prefer to generate 100 kW or greater output within a single small optical aperture of approximately 1.0 sq. inch (6.5 cm$^2$). Another prior art approach, referred to as the 'liquid laser,' is described in International Patent Publication No. WO 03/047052 and uses an amplifier comprised of many thin gain plates with intervening flowing liquid coolant channels, where the amplified beam passes through both the plates and the liquid. Although this scheme is effective at mitigating the OPD within the plates, a major difficulty is encountered from the OPD produced by temperature gradients in the flowing liquid.

In summary, any attempt to scale the device of FIG. 1 to higher output powers is rendered extremely difficult by the sheer bulk associated with multiple devices of this type, each of which must be cooled and have its output beam combined with others to produce a high power composite output. Other approaches to attaining high output powers from solid state lasers also have serious shortcomings.

The zig-zag laser described was a significant advance over another prior art technique that employed side pumping of a zig-zag slab laser. In side pumping, pump laser diodes are arrayed across one or both parallel side faces of the slab and direct the pump energy perpendicular to the principal direction of the light beam being amplified in the slab. One serious problem with this approach was that the effective path length of the pump beams was limited by the thickness of the slab. For a very thin slab, only a small proportion of the pump energy could be absorbed. Increasing the slab thickness allowed for more pump energy to be absorbed, but the thicker slab had significant thermal gradient problems. The side-pumped approach of the prior art is exemplified by the disclosure of U.S. Pat. No. 4,881,233, to von Arb et al., entitled "Laser with Improved Cooling System." The end-pumping approach of U.S. Pat. No. 6,094,297 provided a longer path for the pump beams, and consequently a more efficient device.

Although the end-pumped zig-zag configuration makes relatively efficient use of pump power, it does not satisfy the need for a solid state laser architecture that is scalable to much higher powers, on the order of 100 kw or higher. Combining multiple zig-zag lasers of the type shown in U.S. Pat. No. 6,094,297 results in an extremely bulky structure. Each such laser has to be cooled along its parallel faces, and pump light must be focused into the small end faces of each slab, which enders it next to impossible to place them in close proximity to each other. Combining the output beams of the multiple lasers is also rendered difficult by the bulk and necessary spacing of the individual devices. Moreover, the resulting structure would be impractically large for the powers desired. Ideally, a high-power laser for military or commercial applications should be conveniently portable, or at least movable on a conventional vehicle.

Therefore, it will be appreciated that there is still a need for a high-power solid state laser amplifier structure that meets these requirements. That is to say, there is a need for a sold state laser that is scalable to very high powers, but which is extremely and conveniently compact, to facilitate transport of the device, and to facilitate combination of its multiple output beams into a single high-power composite beam. The present invention achieves these goals, as will shortly become apparent from the following summary and the more detailed description.

SUMMARY OF THE INVENTION

The present invention resides in a zig-zag slab laser amplifier configuration that is readily scalable to high output powers by combining multiple side-pumped slab amplifiers that incorporate a common liquid cooling system. Briefly, and in general terms, the zig-zag slab laser amplifier configuration of the invention comprises a plurality of slabs of solid state material having parallel side faces and configured to function as zig-zag laser amplifiers, the slabs being placed together in a stack, with gaps between adjacent side faces of the slabs. The laser amplifier further comprises at least one source of pump power, disposed adjacent to a side face of at least one outermost slabs in the stack, to provide laser pump power to all the slabs in the stack; and a common cooling system, comprising means for containing and circulating a coolant through the gaps between adjacent side faces of the slabs, and along the side faces of the outermost slabs in the stack. Each of the slabs has an input end face for receiving an input beam and an output end face through which an amplified output beam is transmitted.

More specifically, the common cooling system comprises a pair of side windows positioned in a spaced relationship with the outermost slabs in the stack, to form coolant passages adjacent to the outermost slabs and formed from a material that is transparent to pump power radiation from the at least one source of pump power; and means for sealing around the edges of the gaps between adjacent slabs and providing a coolant communication path extending through all the gaps. The cooling system may be configured to circulate coolant longitudinally across the side faces of the slabs, in a direction generally parallel with a light path between the end faces. Alternatively, the cooling system may be configured to circulate coolant transversely across the side faces of the slabs, in a direction generally perpendicular to the light path between the end faces.

In accordance with one aspect of the invention, each slab may include a longitudinal edge treatment using a material that absorbs or scatters amplified spontaneous emission (ASE) of radiation from the slab. In the transverse coolant flow configuration, each slab may further comprise a longitudinal edge cap shaped to form the desired uniform flow of coolant between adjacent slabs. In addition, the edge cap may have an imbedded electrical heater to provide control of the temperature profile near the slab edges. Water is the preferred coolant because of its large conductivity and heat capacity, but other liquids or mixtures may also be used. For example, ethylene glycol may be added to water to prevent freezing when the system is stored at low temperature.

In accordance with another aspect of the invention, the plurality of slabs of solid state material have dopant levels selected to compensate, in part, for diminution of pump power intensity received by slabs more distant from the source of pump power. Any number of dopant levels may be used, but using only two levels provides sufficient compensation in many cases.

In accordance with another aspect of the invention, the input end face and the output end face of each slab are inclined at an acute angle to the optical axis of the slab, to permit the input beam to be received at the input face in a direction generally parallel with the optical axis, and to provide the output beam also in a direction generally parallel with optical axis of the slab. Alternatively, the end faces may be angled to permit beams to be input and output in an off-axis direction.

In accordance with another aspect of the invention, the amplifier architecture further comprises a dichroic mirror or other optic positioned between the plurality of slabs and the source of pump power. The mirror functions to transmit pump power at a selected frequency but to reflect and effectively remove amplified spontaneous emission (ASE) of radiation from the slabs.

In another embodiment of the invention, multiple stacks of solid state slabs are arranged in a two-dimensional array, to scale the power output even higher and to provide a more symmetrical array of output sub-beams. The multiple stacks preferably employ the same common cooling system and the pump source extends across all of the stacks of solid state slabs.

The invention may also be defined as a high power laser system, comprising a master oscillator, for generating a reference laser beam of desired beam quality and other properties; means for dividing the reference beam into multiple sub-beams; a multi-slab gain module positioned to receive the multiple sub-beams as input beams; and means for adjusting the sub-beams in phase to allow the output sub-beams to be coherently combined as a single composite output beam. Optionally, additional multi-slab gain modules similar to the first multi-slab gain module are positioned to receive as input, amplified output sub-beams from the first multi-slab gain module. The additional multi-slab gain module or modules generate further amplified output sub-beams of high aggregate power. Each of the multi-slab gain modules comprises at least one plurality of solid state slabs functioning as zig-zag amplifiers, at least one source of pump power disposed adjacent to sides of the gain module, and a common liquid cooling system for cooling the slabs. The laser system may also comprise means for effecting a second pass through the one or more multi-slab gain modules, either by polarization multiplexing, angular multiplexing, or combination of both. Thus, the system may additionally comprise a polarizer, for polarizing the input sub-beams; beam relay optics, for optically processing the output sub-beams from the first and additional multi-slab gain modules; means for changing the polarization of the output sub-beams from the last of the additional multi-slab gain modules; and a mirror for reflecting the output sub-beams from the train of multi-slab gain modules back through the multi-slab gain modules for a second amplification pass. The polarizer operates to out-couple the amplified sub-beams on completion of the second amplification pass. Multi-passing of the gain modules can also be achieved by angular multiplexing, where the beam is redirected through one or more multi-slab gain modules with a slightly different entrance angle. Preferably, the system also comprises means for sampling the final output sub-beams on completion of the amplification passes; means for sensing phase differences between the phases of sampled outputs of the sub-beams obtained from the means for sampling, and the phase of the reference beam; and means for adjusting the phases of the input sub-beams to provide a coherent set of output sub-beams that can be readily combined into a high-power composite output beam.

Each of the multi-slab gain modules in the laser system may comprise multiple pluralities of solid-state slabs arranged in a two-dimensional array, and each of the multi-slab gain modules may have the other features discussed above.

It will be appreciated from the foregoing summary, that the invention provides a significant advance in the field of high-power laser amplifiers and laser systems. In particular, the invention provides a solid state amplifier structure in which multiple slabs of solid state material are stacked together, side-pumped from a common pump source and cooled by a common cooling system. Other aspects and advantages of the invention will become apparent from the following more detailed description, taken in conjunction with the accompanying drawings.

BRIEF DESCRIPTION OF THE DRAWINGS

FIG. 4 is a top view similar to FIG. 2, but depicting the use of a dichroic mirror to remove amplified spontaneous emission (ASE).

FIGS. 11A-11C are graphs similar to FIGS. 9A-9C, wherein six different dopant levels are used in the eleven slabs.

DETAILED DESCRIPTION OF THE INVENTION

Figure 1:
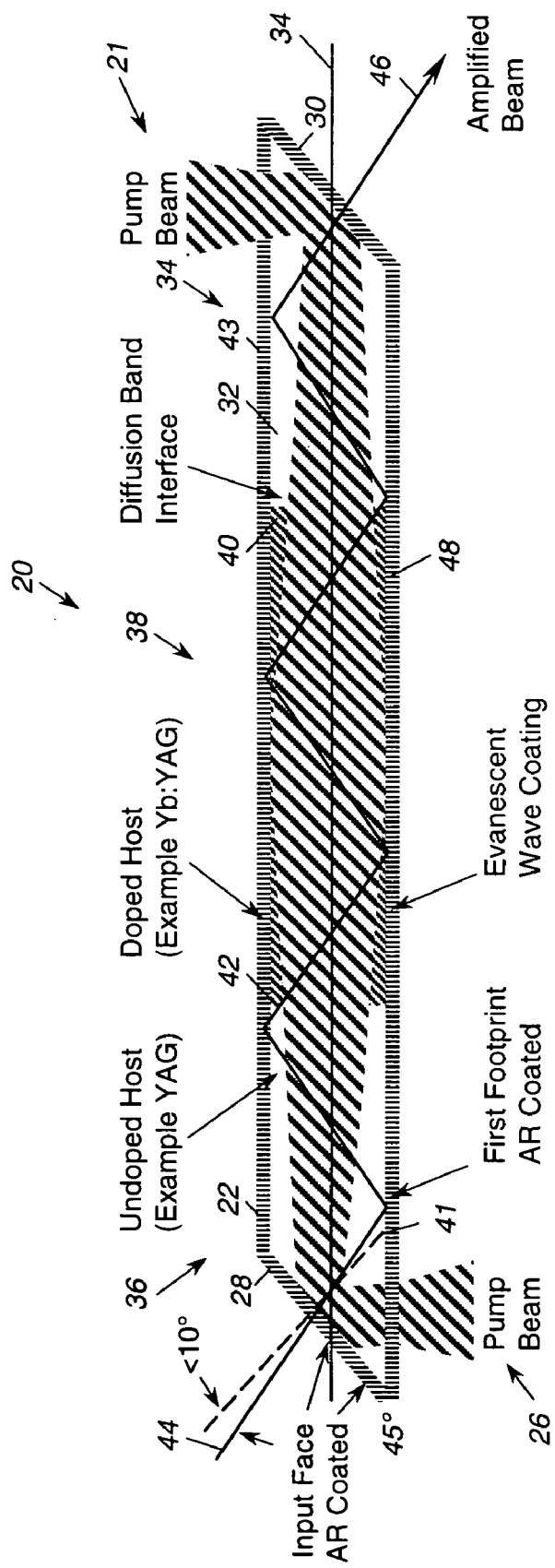
FIG. 1 is a diagrammatic top view of a zig-zag laser amplifier of the prior art.

As shown in the drawings for purposes of illustration, the present invention pertains to a sold state zig-zag amplifier configuration that is readily scalable to very high output powers. As discussed above, zig-zag laser amplifiers of the prior art cannot be easily scaled to higher powers without using an extremely bulky structure, and even then the resulting multiple beams cannot be easily combined into a single small beam aperture.

Figure 2:
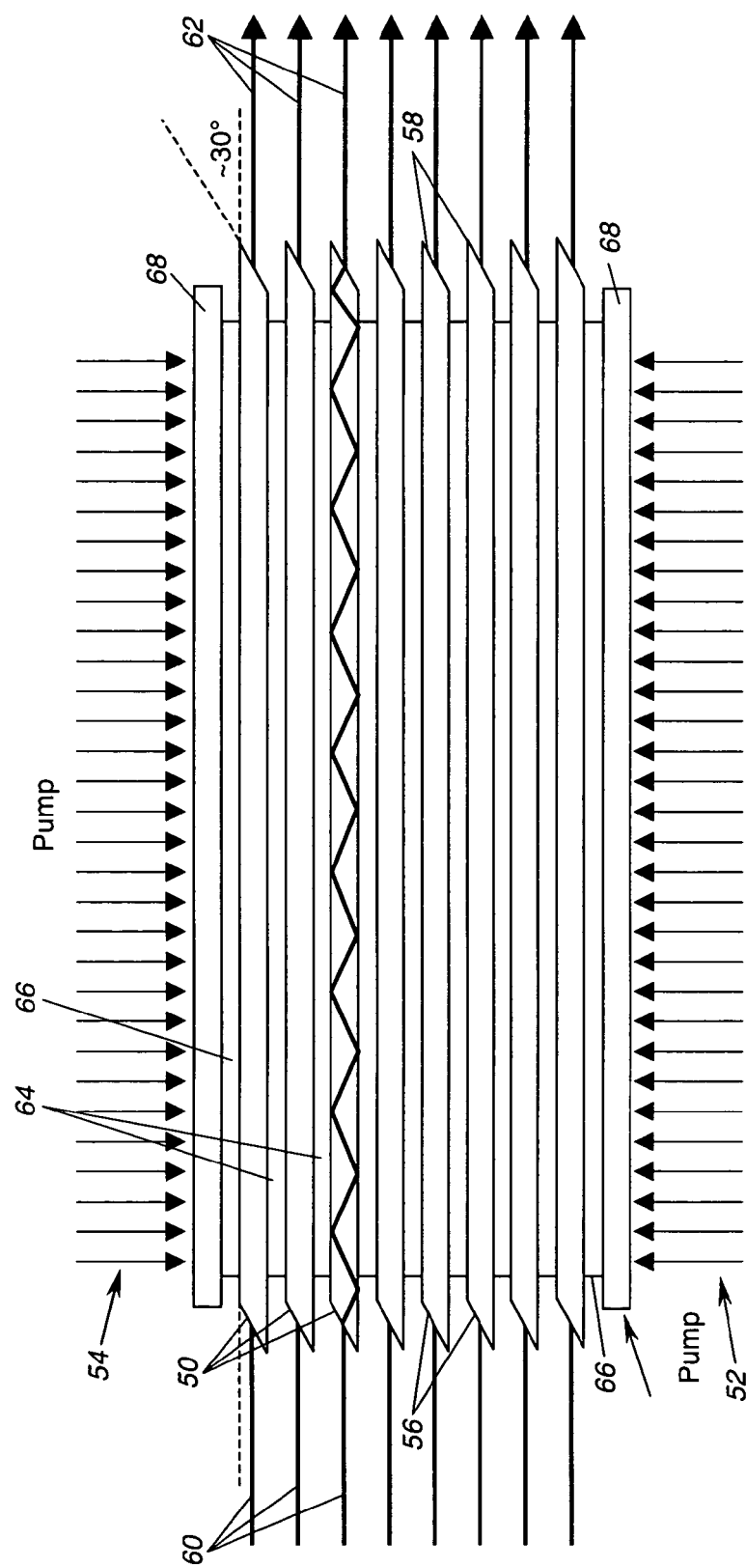
FIG. 2 is a diagrammatic top view of a scalable stack of zig-zag laser amplifiers in accordance with the present invention.

In accordance with the present invention, and as shown generally in FIG. 2, scaling of zig-zag amplifiers to higher powers is conveniently achieved by employing side pumping of stacked slabs and a common cooling system. As shown in the figure, multiple solid state slab lasers 50 are stacked in close proximity and arrays 52, 54 of pump lasers are directed from the sides of the outermost slabs. Pump power from the arrays 52, 54 of pump lasers is focused by appropriate optical components for collimation and shaping of the pump beams. End faces 56 and 58 of each slab 50 are angled at a more acute angle than the 45° angle that was used in the FIG. 1 prior art configuration to facilitate end-launching of the pump beams. In the present invention, input beams 60 may be launched in parallel through the end faces 56, in a direction close to parallel to the longitudinal axis of the slabs 50. The input beams 60 are refracted from the end faces 56 and continue their zig-zag paths though the slabs 50, emerging from the end faces 58 as a set of parallel output beams 62.

Liquid cooling of the slabs 50 is effected through spaces 64 between adjacent slabs 50 and additional spaces 66 between the outermost slabs and respective parallel windows 68. Coolant, which is preferably water, flows through the spaces 64 and 66 either in a longitudinal direction, parallel to the input and output beams 60 and 62, or in a transverse direction, perpendicular to the plane of the paper on which FIG. 2 is printed. Transverse coolant flow is preferred mechanically because longitudinal flow has inherent "plumbing" difficulties in routing the water flow in such a way that avoids the input and output beams 60, 62 at the respective ends of the structure, and still provide the needed uniform flow across the slab face. However, transverse flow leads to an inherent temperature gradient, which although small, causes transverse OPD distortion along the height of the amplified laser beam. An important advantage of liquid cooling is that the liquid may by used, with an appropriate additive, to absorb amplified spontaneous emission (ASE) from the slabs 50.

Side pumping of a single slab laser was a prior art approach that was thought to be impractical for high powers because it resulted in a very short path length for the pump beams, and consequently the pump energy was not efficiently absorbed and utilized in the amplifier. Increasing the slab thickness to improve pump energy absorption resulted in undesirable temperature gradients in the slab. In the present invention, however, side pumping can be more efficiently used in association with a stack of multiple, relatively thin slabs 50. A possible disadvantage of this relatively long path length for the pump beams is that the pump energy diminishes toward the middle of the stack of slabs 50. Contributing to this drop are the inherent losses encountered at the boundaries between adjacent slabs 50. However, as further discussed below, this difficulty can be readily overcome by varying the doping levels of the slabs 50. In brief, a higher doping level in the more central slabs 50 increases energy absorption and compensates for the diminished pump energy in the middle of the stack, thereby equalizing the absorbed power among the slabs. In addition, application of anti-reflection (AR) coatings on the slab faces can minimize losses at the coolant-slab interfaces.

To minimize lateral temperature gradients in each slab 50, the slabs may be made relatively thin. Reduction in the power output of a slab by making it thinner is compensated by adding more slabs to the stack. Practical limitations to the thinning of the slabs 50 are, first, manufacturing difficulties that increase as the slab thickness is reduced and, second, an optical limitation that is reached if the slabs are made so thin that diffraction occurs within each slab and the intensity of the amplified beam is adversely affected. For these reasons, a slab thickness less than about 1-2 mm is not practical or advisable.

The configuration of the present invention builds upon the prior art zig-zag laser technology, but allows a much more compact arrangement and the total power output may be scaled up to 100 kW or more. An evanescent coated zig-zag slab is used, but in a stack array of many such slabs, with intervening thin liquid cooling channels, and employing side pumping as shown in the amplifier module of FIG. 2.

This configuration offers a number of features that simultaneously solve many problems encountered in side pumped and scalable high average power laser systems of the prior art:

1) In the side pumped arrangement of the invention, the slabs 50 can be arbitrarily thin (within the fabrication and diffraction limitations described above) without regard to the limited absorption of such a thin slab. The stack of many such thin slabs can easily be made such that the aggregate thickness is sufficient to provide adequate absorption of the pump beam. In addition, the doping level of the lasant species can be adjusted from slab to slab to ensure uniform deposition of pump power over the entire slab array.

2) The intervening cooling channels, between slabs 50, provide excellent thermal management of the slabs such as to reduce the OPD in accordance with the well understood behavior of thin surface cooled slabs. Undoped end regions are not required and the side pump intensity can also be tapered near the ends of the pumping region to minimize the effects of thermal gradients in the end regions.

3) Each slab amplifies a separate beam, which will be referred to as a "beamlet" to distinguish from a composite output beam. Because of the compactness of the array, the beamlets can be managed collectively as a co-propagating group of beams within a single optical aperture. For example, if each slab 50 has a cross-section of 1.5×25 mm, and 15 such slabs are each separated by a cooling channel of 0.5 mm thickness, the total array aperture is 30×25 mm, which easily fits within standard 2-inch (5-cm) diameter optics. As a result, the size and cost of the aggregate system is dramatically reduced, when compared, for example, to a similar number of slabs used in the end pumped and conductively cooled configuration. ASE coupling between adjacent slabs may be mitigated by including additive(s) to the coolant to preferentially absorb ASE emitted from the slabs without affecting the pump transmission.

4) The evanescent coating should eliminate previous difficulties encountered with side pumping of slabs; i.e., perturbation of the evanescent field by bubbles, contaminants, and other inhomogeneities within the coolant, and damage to coolant seals in contact with the slab by the powerful evanescent field of the amplified laser beam. Since the evanescent coating reduces the amplified beam intensity that penetrates the evanescent coating to near zero, these issues are greatly mitigated. In addition, the slab coatings may be combined with an anti-reflection (AR) capability at the pump (to minimize pump losses) and laser wavelengths (to avoid parasitic oscillations).

5) Finally, the group of beamlets may utilize many of the prior art techniques utilized in single beam systems. Thus, a beamlet array gain module (BAGM) can be configured in an amplifier chain in a number a ways used for single beams in the prior art. The amplifiers can be cascaded and multi-passed in the usual fashion by angular multiplexing, polarization multiplexing, or a combination of the two. Schematics of five exemplary amplifier systems utilizing various configurations that are single-passed, double-passed, four-passed, polarization multiplexed, and angle multiplexed, are shown in FIGS. 3A-3E.

Figure 3A:
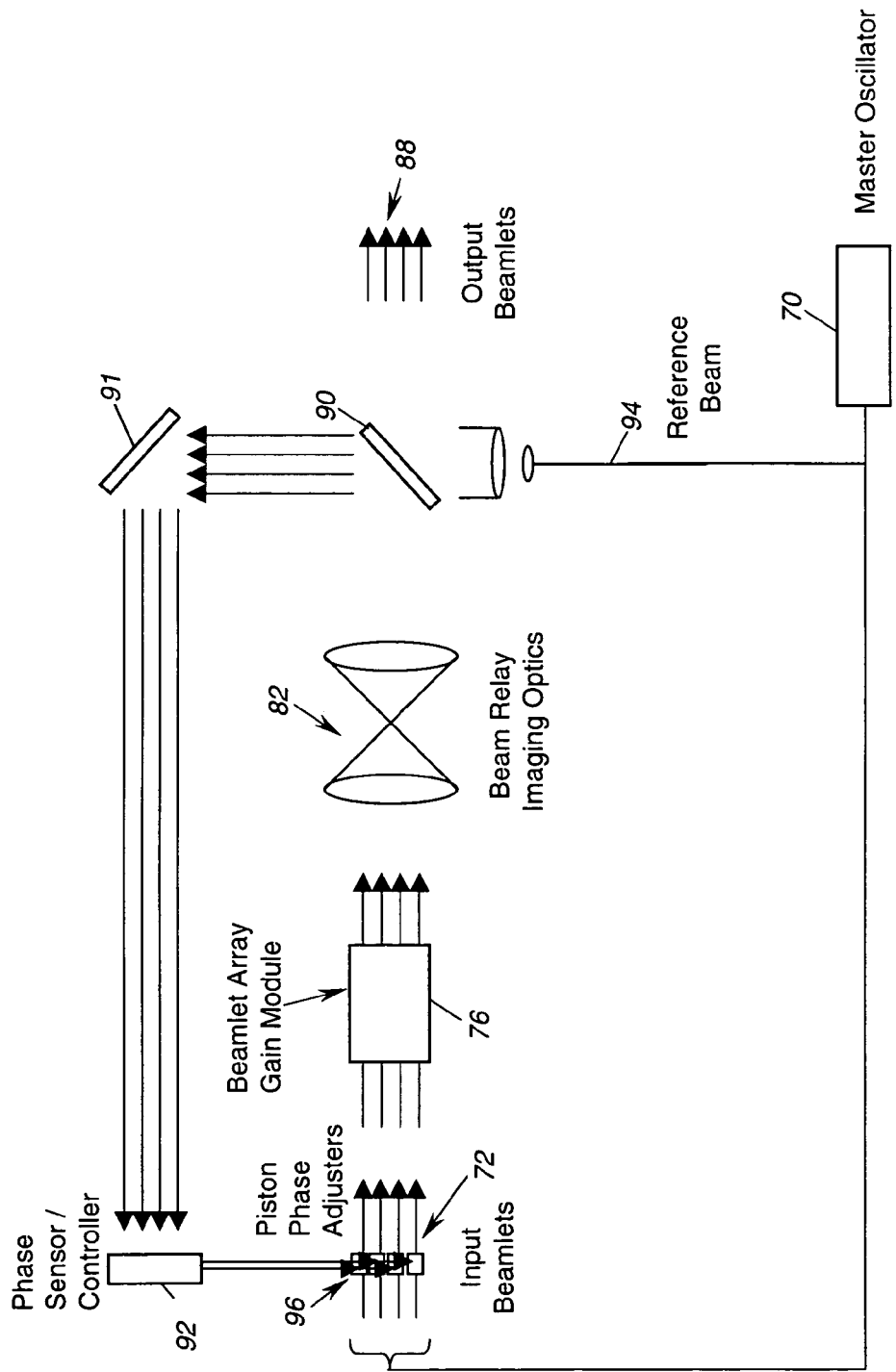
FIG. 3A is a schematic diagram of a laser system utilizing a scalable multi-slab amplifier module in accordance with the present invention.

The exemplary system of FIG. 3A includes a master oscillator 70 that produces multiple input beamlets 72, which are input to a multi-slab gain module 76, the output of which passes multiple beamlets through beam relay imaging optics 82 and through a partially reflective mirror 90, which out-couples the amplified beamlets as a composite output beam 88. Samples of the output beamlets are reflected by the mirror 90, then by an additional mirror 91 or other optics, to a phase sensor/controller 92, which provides control signals to piston phase adjusters 96.

Figure 3B:
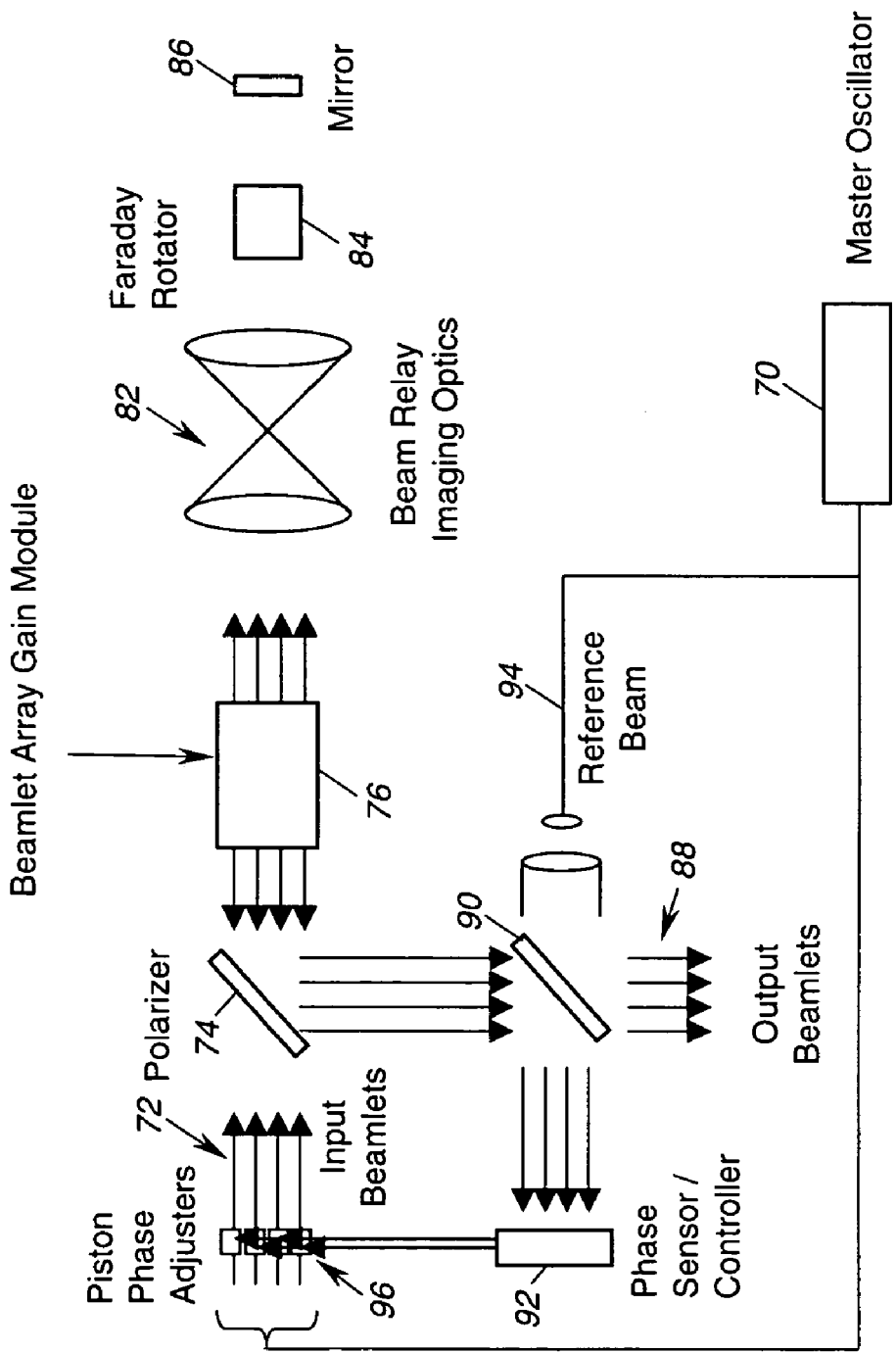
FIG. 3B is a schematic diagram similar to FIG. 3A, but showing double-passing through the multi-slab amplifier module, by means of polarization multiplexing.

FIG. 3B shows a configuration similar to FIG. 3A, but provides for double-passing of the gain module 76. In this configuration, a polarizer 74 is disposed in the path of the input beamlets 72 and a Faraday rotator 84 and a mirror 86 are located to receive output beamlets from the beam relay optics 82. The Faraday rotator 84 and mirror 86 together result in effecting a change in the polarization angle of the output beamlets, which are then reflected back through the beam relay optics 82 and the gain module 76. After this second amplification pass, the beamlets are reflected by the polarizer 74 and out-coupled through the partially reflective mirror 90, as in FIG. 3A.

Figure 3C:
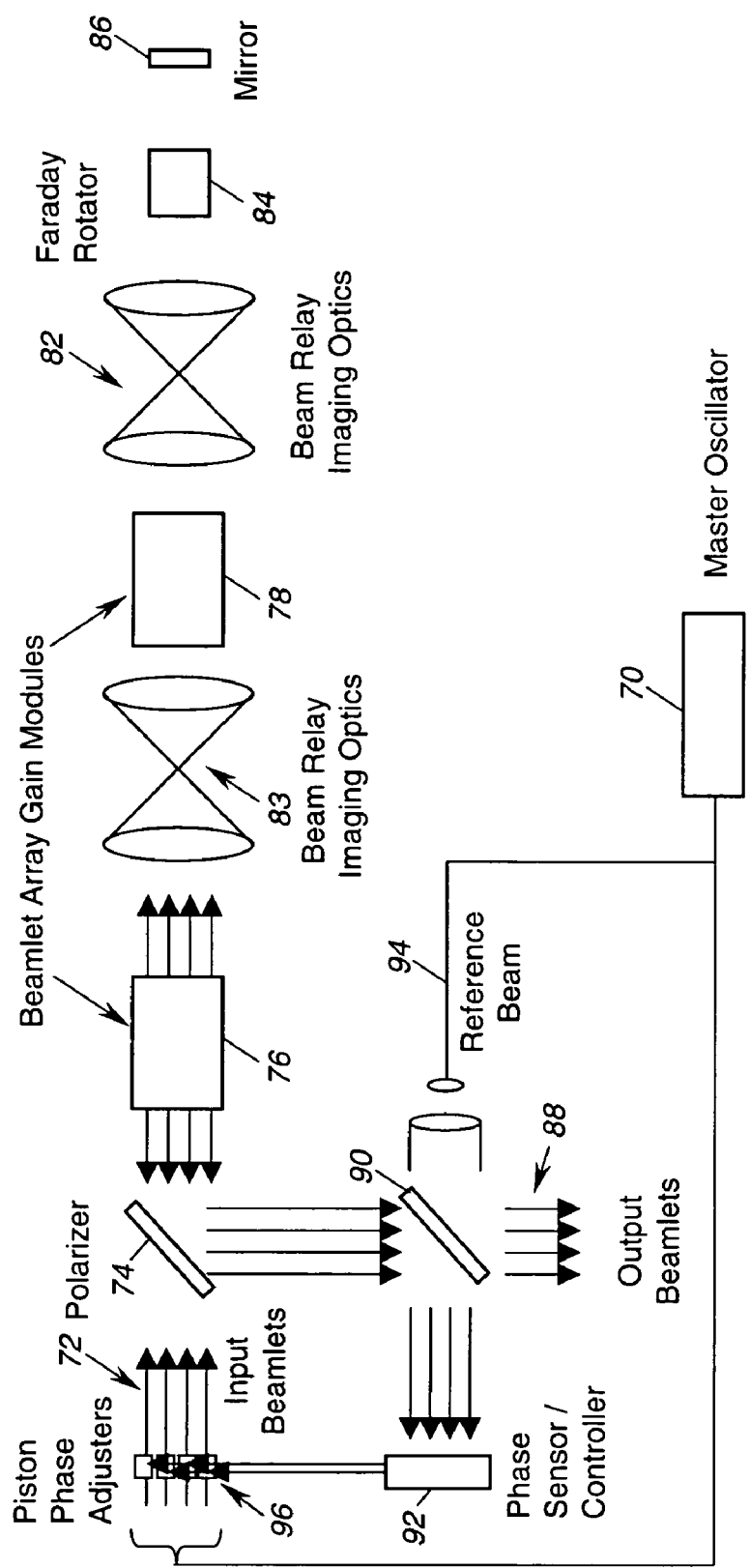
FIG. 3C is a schematic diagram similar to FIG. 3B, but showing multiple multi-slab amplifier modules double-passed by polarization multiplexing.

The configuration of FIG. 3C is similar to that of FIG. 3B, except that an additional beamlet array gain module 78 is included, preceded by additional beam relay imaging optics 83.

Figure 3D:
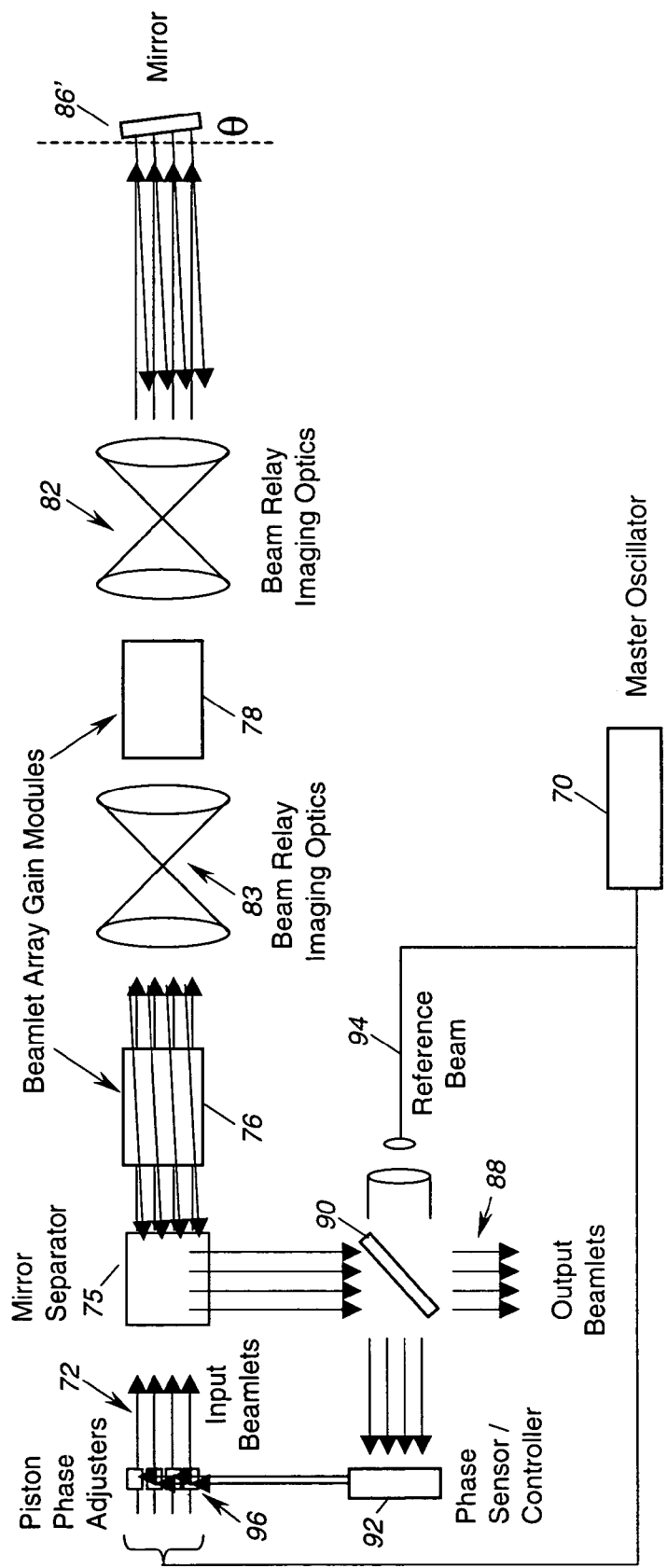
FIG. 3D is a schematic diagram similar to FIG. 3C, but showing multiple multi-slab amplifier modules double passed by angular multiplexing.

In FIG. 3D, multiple beamlet array gain modules 76, 78 are again employed, but in this configuration angular multiplexing is used to achieve a second pass of the gain modules. An inclined mirror 86' reflects output beamlets back for a second pass, but along optical paths that are slightly angularly displaced from the paths in the first pass. A mirror separator module 75 is positioned to receive beamlets only along these angularly displaced paths, and to reflect them to the partially reflective mirror 90.

Figure 3E:
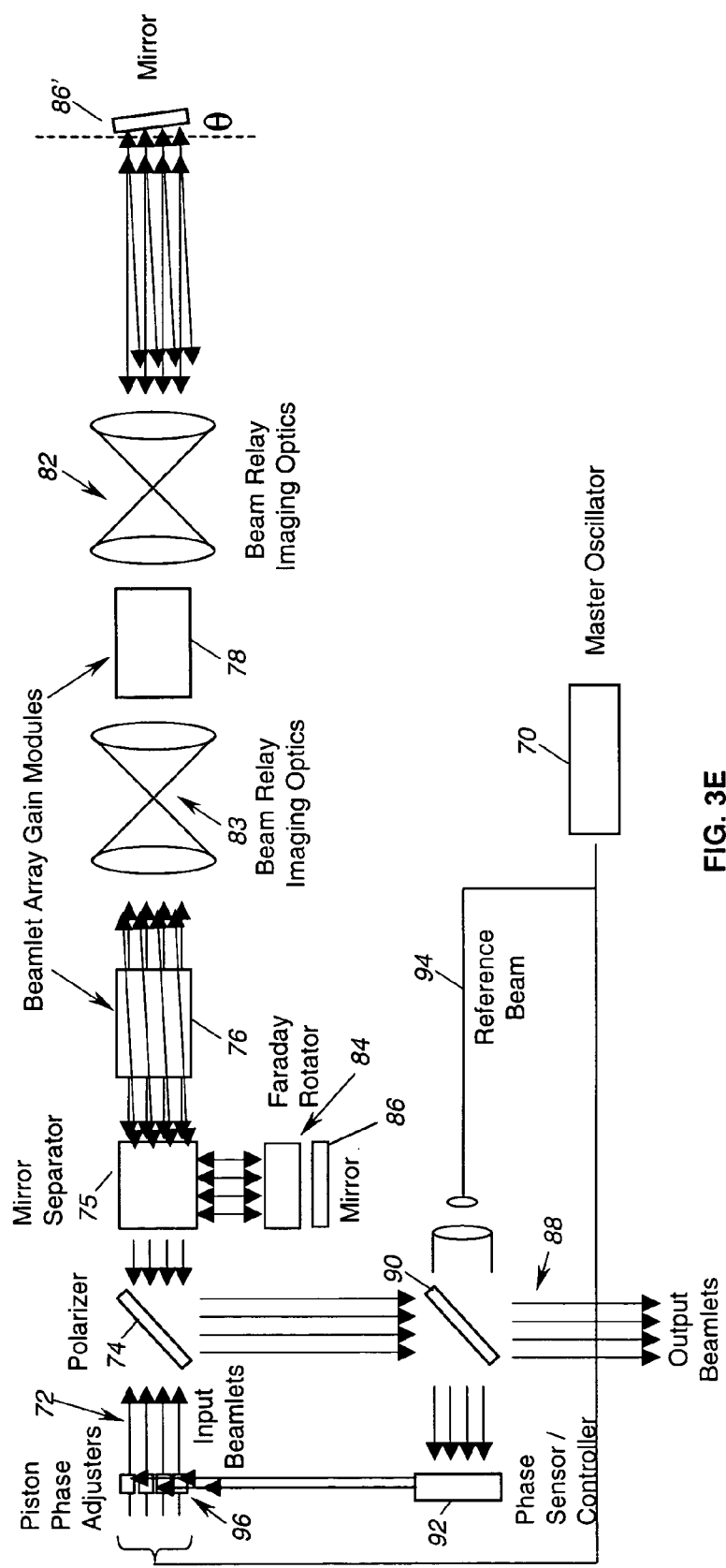
FIG. 3E is a schematic diagram similar to FIG. 3D, but showing multiple multi-slab amplifier modules that are four-passed using a combination of polarization multiplexing and angular multiplexing.

Finally, the FIG. 3E configuration provides for a combination of both polarization multiplexing and angular multiplexing, to achieve four passes through the gain modules 76 and 78. This configuration includes both the polarizer 74 and the mirror separator module 75. The first two passes are similar to those in the configuration of FIG. 3D. The inclined mirror 86' redirects the beamlets back along angularly displaced paths for the second pass. After the second pass, the mirror separator module 75 out-couples the second-pass beamlets, but instead of transmitting them to the mirror 90, passes them through the Faraday rotator 84 and onto the mirror 86. In this way, the beamlets are reflected back to the mirror separator module 75 and back along the same optical paths that were followed in the second pass. At the conclusion of this third pass, the beamlets are again reflected by the inclined mirror 86' and begin a fourth pass through the gain modules 76, 78, following the same optical paths that were traversed in the first pass. The mirror separator module 75 is effectively transparent to the beamlets emerging after the fourth pass, so the beamlets encounter the polarizer 74 and are finally out-coupled through the partially reflective mirror 90.

In each of the described configurations of FIGS. 3A-3E, the beam phasing effected by the phase sensor/controller 92 and the piston phase adjusters 96 is basically as described in U.S. Pat. No. 6,404,784, issued to Komine and entitled "High Average Power Solid-State Laser System with Phase Front Control."

The compact arrangement of the group of beamlets in all of the described configurations also allows for beam correction within a single aperture, further contributing to the reduced size and weight of the system. Thus, one may also utilize a number of prior art methods of phase and birefringence correction, such as deformable mirrors, which are well understood in the art, and phase conjugation (e.g., as described in U.S. Pat. No. 5,555,254, issued to Injeyan et al. and entitled "High Brightness Sold-State Laser with Zig-Zag Amplifier" and U.S. Pat. No. 5,640,406, issued to Injeyan et al. and entitled "Birefringence Compensated Laser Architecture."). Since all the beamlets can be focused into a single volume, the continuous total power level may even be sufficient for stimulated Brillouin scattering (SBS) phase conjugation. Thus, for example, in FIGS. 3B-E the conventional end mirror 86 or 86' can be replaced by a deformable mirror or an SBS cell. As a result the OPD variations within all the optical beamlets can be mitigated by this single corrective optic. In addition it is possible that the relative phase between beamlets could be corrected by this optic as well, possibly eliminating or reducing the need for phase sensing and correction at the amplifier output. Thermal control of slab edges, through the use of heaters in slab edge caps, to reduce OPD variation may also be employed in a manner similar to that used in single slab systems. For example, see U.S. Pat. No. 6,034,977, issued to St. Pierre et al. and entitled "Optical Path Difference Control System and Method for Sold State Lasers."

In the system of FIG. 2, it is desirable to absorb as much of the ASE as possible from the slabs in the intervening coolant, to mitigate further spurious amplification and parasitics. This can be accomplished by direct absorption by an agent added to the coolant, however it must have minimal absorption at the pump wavelength. Alternately, thin solid absorbing slabs can be introduced between the gain slabs and within the coolant channel. Again one would require these absorbing slabs to introduce minimal loss at the pump wavelength, and therefore an AR coating could be applied. Similarly, at the ends of the stack of slabs, the windows 68 (transparent at the pump wavelength) that provide containment of the coolant can be utilized to absorb, scatter, or diffract ASE so that additional irradiation and heat load is not incident upon the diode pumps. Alternatively, and as shown in FIG. 4, a thin-film dichroic or other optic 100, located outside of each window 68, can be used to protect the pump diodes by highly reflecting the ASE into a heat dump, as indicated by the arrows 102, while transmitting the pump light 52 into the stack of slabs 50.

Figure 5:
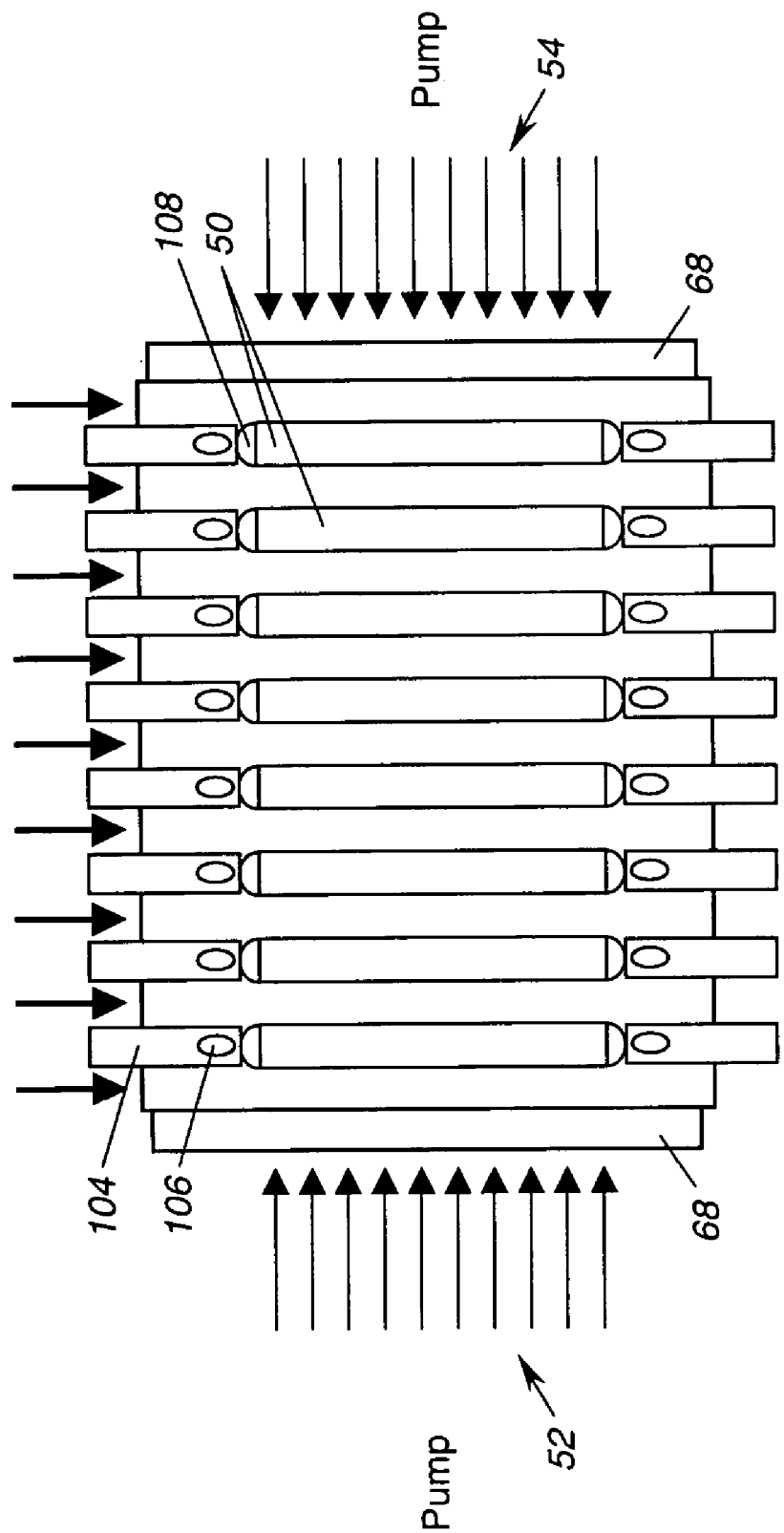
FIG. 5 is an end view of the scalable stack of zig-zag laser amplifiers of the invention, depicting transverse coolant flow.

As briefly mentioned above, the direction of coolant flow can be chosen either along the zig-zag direction (the long length of the slab) or transverse to it. A transverse flow is perhaps simpler to implement mechanically as depicted in the end view of FIG. 5. The flow channel can be adjusted for fully developed turbulent flow by properly shaped sidewalls, as indicated at 104. Within these sidewalls a heater 106 may be included to contact the slab edge and provide thermal adjustment. In addition, the edge of the slab may be treated, as indicated at 108, to minimize back reflection of ASE, as has been utilized in previous zig-zag systems. Sealant and insulation may be applied if required at the interface between the sidewalls of the edge-cap and slab edge to prevent contamination of the coolant and to obtain adequate thermal behavior of the heaters and slab edges.

Figure 6:
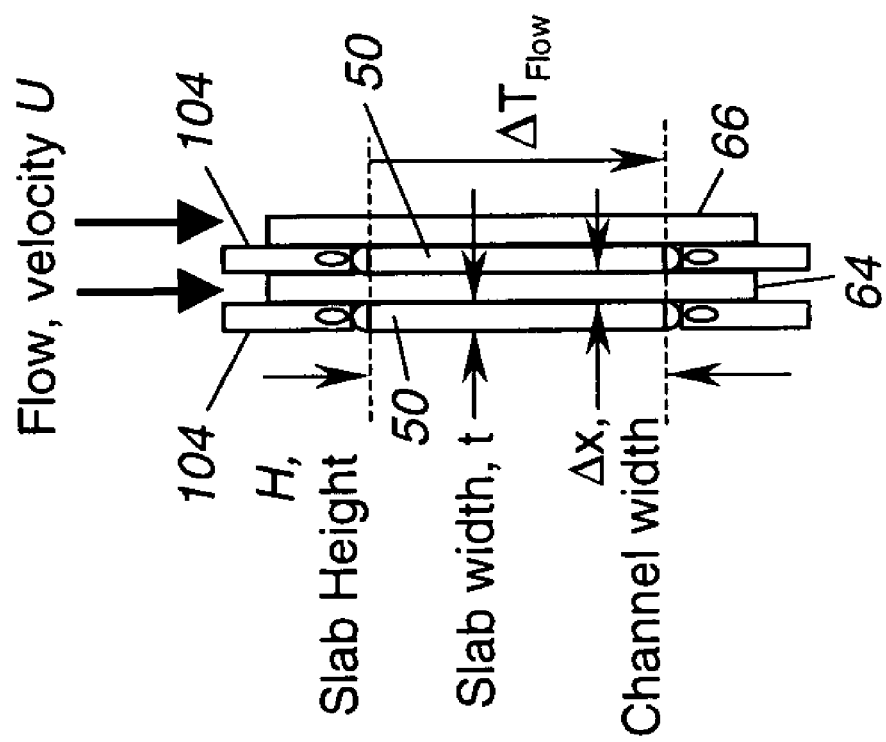
FIG. 6 is a fragmentary view similar to FIG. 5, to illustrate terminology concerning temperature gradient calculations.

Transverse coolant flow leads to a temperature gradient along the flow (and therefore to slab OPD) which is not compensated by the zig-zag propagation. The change in coolant temperature over the flow direction is given by $$\Delta T_{flow} = \frac{Q \cdot t \cdot H}{(C_p \rho) \cdot \Delta x \cdot U}$$

where Q is the deposited heat density in the slab, t is the slab thickness, H is the slab height, $C_p\rho$ is the heat capacity per unit volume of the coolant, $\Delta x$ is the coolant channel width, and U is the coolant velocity (see FIG. 6). For the conditions found in one embodiment of the invention, Q=670 W/cc, t=2.5 mm, and H=25 mm, and with a $\Delta x$=1 mm water cooling channel ($C_p\rho$=4.2 J/cc ° K) of velocity 10 m/s, this temperature gradient is only approximately 1° C. This leads to an approximately linear transverse OPD variation of ~ 1.5 waves for a uniformly pumped slab of length 10 cm. Since this modest size OPD variation should be approximately linear across the flow direction, it is possible to compensate for it effectively by using cascaded pairs of such amplifier modules with alternating flow directions. Thus, the linear OPD gradient will be of opposite directions in the two amplifier modules of a pair, the gradients will therefore cancel and the net OPD will be approximately uniform.

Figure 7:
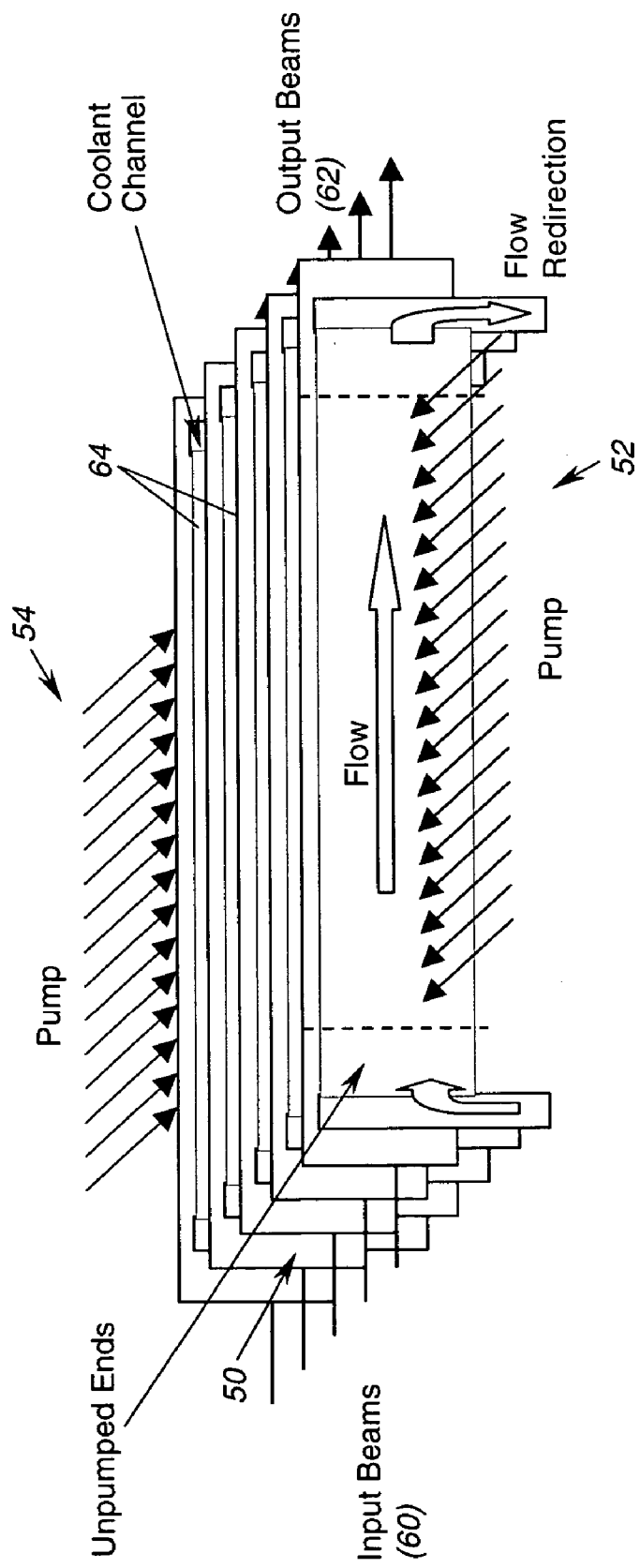
FIG. 7 is a perspective side view of a stack of zig-zag laser amplifiers of the invention, depicting longitudinal coolant flow.

Alternatively, the flow can be directed along the length of the slab. In this case the zig-zag propagation should effectively compensate for the resulting slow temperature gradient along the slab length. The mechanical arrangement is a bit more complex in this configuration, since the coolant must be redirected out of the vicinity of the optical path before the slab ends. Note that, as opposed to the end pumped scheme, side pumping eliminates the need for undoped sections at the slab ends, and the pump intensity can be tapered near the ends of the pumping area to minimize the resulting temperature gradients, which is known to minimize induced birefringence. The coolant flow can be redirected adjacent to the unpumped regions near the slab ends. An example of such a configuration is shown in FIG. 7. Regardless of flow direction, seals are required near the slab ends for coolant containment. However, the presence of the evanescent coating minimizes potential damage to the seals from the internally reflected amplified laser beam.

Side pumping has the advantage of providing uniform excitation over the entire pumped region. In the prior art end-pumped amplifier, the end-pumped slabs effectively use only 6 of the 10 cm doped region (since the exponential absorption length from each end is 3 cm). Thus, a slab that is side-pumped over a 10 cm long region has approximately 10/6=1.7× the stored energy of end-pumped slabs at the same peak pumping density. Assuming similar extraction efficiency would therefore allow a similar increase in extracted power when compared to an end-pumped slab.

Note also that side pumping permits a much larger pump entrance aperture than end pumping, and thus the side-pump intensity required at the slab face is significantly lower than end-pumping for similar total powers. As an example, in one prior art end pumping device, the pumping intensity is approximately 8 kW/cm² at each end of a 10-cm slab of cross section 0.25×2.5 cm, for a total of 10 kW pump power. Consider by way of contrast a side pumped system with ten slabs in the array, where each slab has the same size and total pumping power as in the prior art example. Thus the total pump power is approximately 10×10 kW=100 kW, incident on 25 cm² of each slab side face. Therefore a system with ten times the power capacity of the prior art embodiment requires only approximately 2 kW/cm² pumping intensity, or ¼ of the pump intensity.

As already mentioned, major advantage of this approach is the ability to reduce the slab thickness t without sacrificing pump absorption efficiency. The reduction of slab thickness can yield a very significant reduction in OPD magnitude, as well as improvement in residual birefringence. The increase in slab temperature, averaged over the zig-zag path is given by $$\Delta T_{Avg} = Q[t^2/12K + t/2h]$$

where K is the slab conductivity, and h is the convective cooling coefficient of the coolant. This is illustrated in Table I, which shows the calculated slab temperature increase and total OPD resulting from a maximum a heat load 670 W/cc over an effective length of 6 cm in a YAG slab (K=0.1 W/cm ° K., h=5 W/cm² ° K.). The effective coefficient of index change (defined by OPD≡$\Delta T \cdot dn_{eff}/dT \cdot L$) is given by $dn^{eff}/dT = dn/dT + (n-1)\alpha = 13 \times 10^{-6}$ ° $K^{-1}$, where n is the YAG index (1.818) and α is the coefficient of thermal expansion ($7 \times 10^{-6}$ ° $K.^{-1}$). It can be estimated from these relationships that significant OPD reduction can be achieved using slabs with a thickness less than 2 mm.

TABLE I

| | Temperature Increase | | | |
|---|---|---|---|---|
| t (mm) | Conduction | Convection | Total Temp | OPD (Waves) |
| 2.5 | 34.7 | 16.7 | 51.4 | 46.0 |
| 2 | 22.2 | 13.3 | 35.6 | 31.9 |
| 1.5 | 12.5 | 10.0 | 22.5 | 20.2 |
| 1 | 5.6 | 6.7 | 12.2 | 11.0 |
| 0.5 | 1.4 | 3.3 | 4.7 | 4.2 |

Calculations of fully developed turbulent water flow demonstrate that effective removal of heat can be accomplished over a range of channel thickness and flow velocity. For example, using uniform heat deposition (Q=670 W/cc) in a slab 10 cm long, 25 mm high and 2.5 mm thick, where the coolant flow is transverse to the length of the slab, using flow velocities between 2 and 10 m/s, using channel thicknesses from 0.25 to 1 mm, the resultant coolant temperature gradient $\Delta T_{Flow}$ (see FIG. 6) falls within an acceptable range of 0.5 to 5° K.

Figure 8:
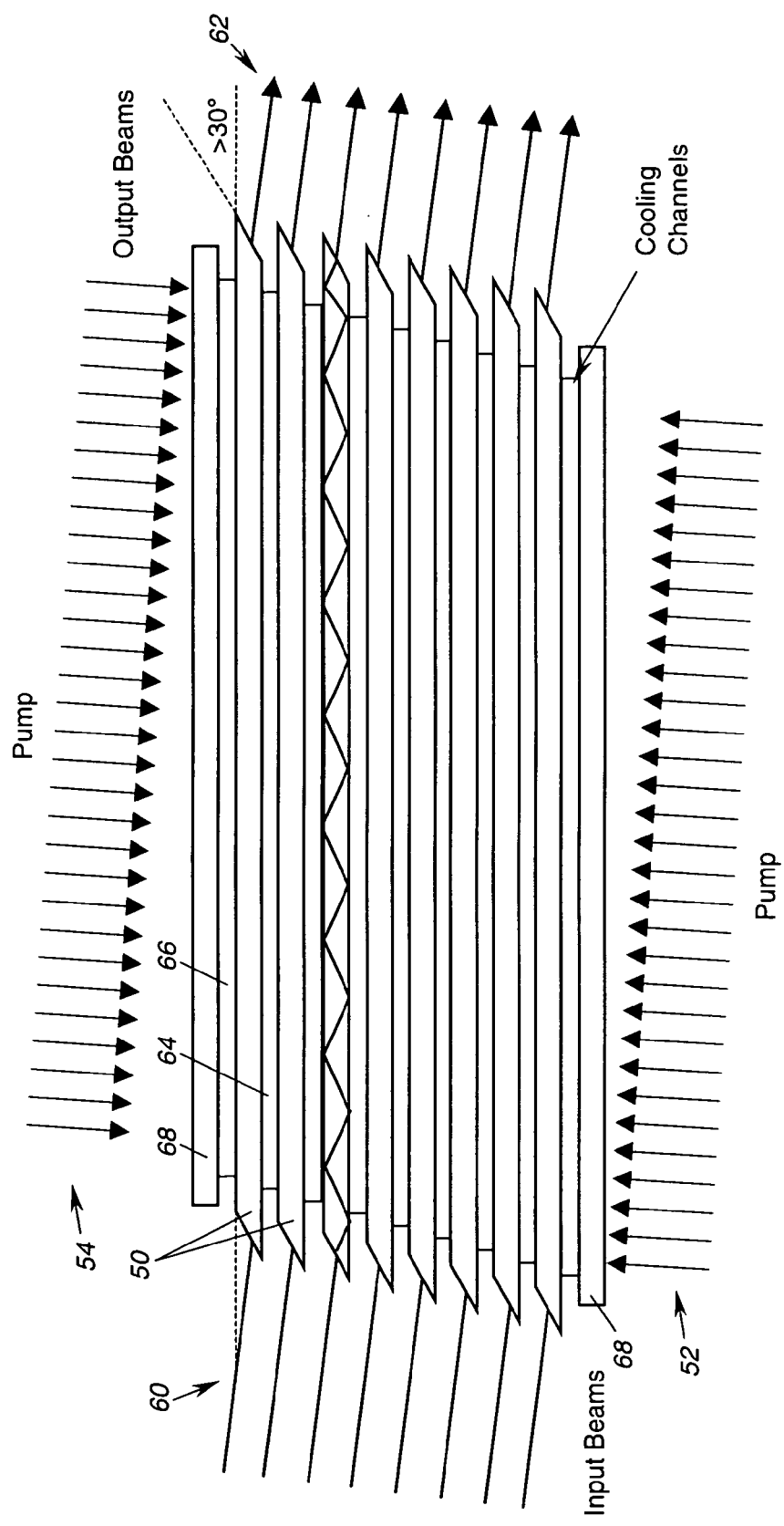
FIG. 8 is a top view similar to FIG. 2, but showing an alternative embodiment in which input and output beams are angled to the optical axis.

The arrangement of FIG. 2 shows the input and amplified beams entering the slabs 50 on axis. This can be accomplished if the entry face of the slabs is cut at an angle near 60° to normal (30° to the optical axis). This will ensure the amplified beam appropriately propagates near total internal reflection (TIR). Coincidentally, Brewster's angle for YAG in air is about 61°, which would eliminate any spurious reflections for P-polarization on input and output. However, in many circumstances amplification of both polarizations is desirable and therefore an appropriate AR coating for the S-wave would be required on the entry faces. The amplifier can also be configured with off-axis input and output beams, and varied entry face angles, as shown in FIG. 8. In this arrangement, depending on the angle of incidence of the input and output beams, the slabs 50 may need to be staggered to ensure clearance of the adjacent beams. If so, then the pumping direction may be tilted to match the staggered geometry.

If all the slabs 50 are identical (same thickness and doping level), then although one can obtain complete absorption of the pump beams, the power deposited will vary greatly from one slab to the next. For example, an Nd doping concentration of 0.14% may result, under certain design assumptions, in a pump absorption depth of approximately 3 cm. Consider, for example, a stack of 11 slabs, each 2.5 mm thick. One would require a doping of 0.62% for a total slab opacity of 4 Nepers (e-foldings), or >98% pump absorption (for this calculation pump losses from the coolant and slab face reflections are ignored).

Figure 9A:
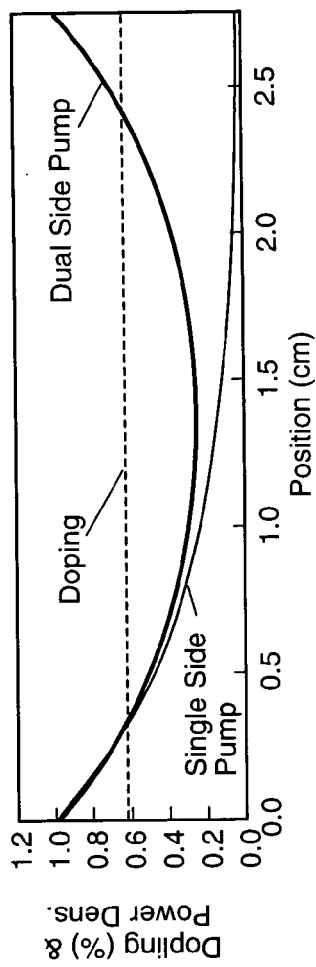
FIGS. 9A-9C are graphs showing the variation in absorbed pump power for a stack of eleven identical slabs.
Figure 9B:
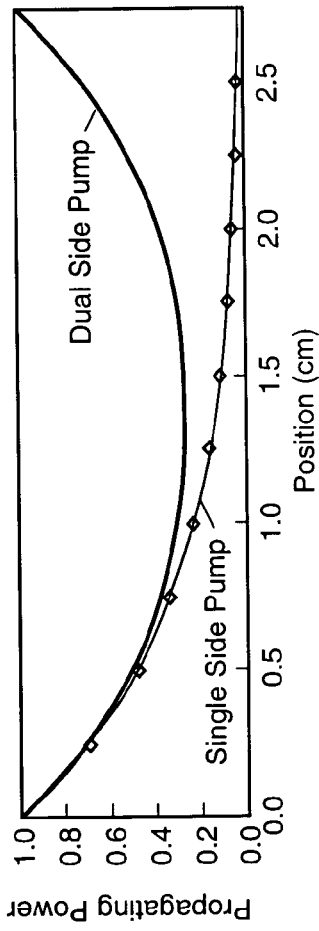
Figure 9C:
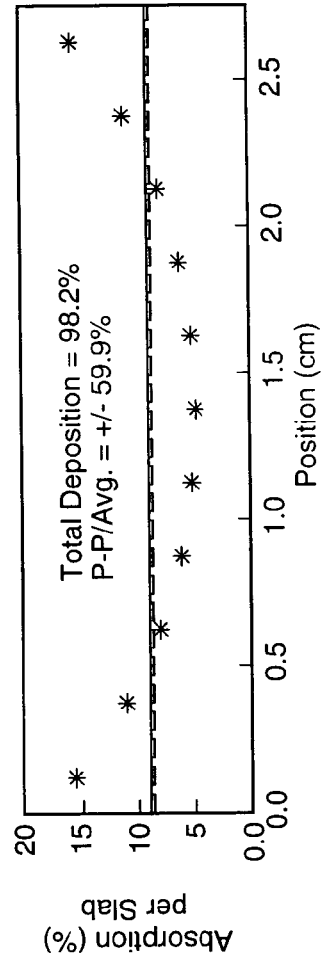

FIG. 9A shows, for a stack of eleven slabs, each 2.5 mm thick, the variation of doping (the dashed line indicating a constant percentage across all slabs), and the variation in absorbed power density through the stack of slabs for single sided and dual sided pumping. FIG. 9B depicts the variation in propagating power through the stack of slabs, again for the single sided and dual sided pumping cases. FIG. 9C plots calculated absorbed power (asterisks) for each of the eleven slabs, for the dual sided pumping case only. The dashed line indicates the average power absorbed, and the solid line indicates the average power if 100% of the pump was absorbed. The absorbed pump power in the eleven slabs varies by approximately ±60% with respect to the average.

Figure 10A:
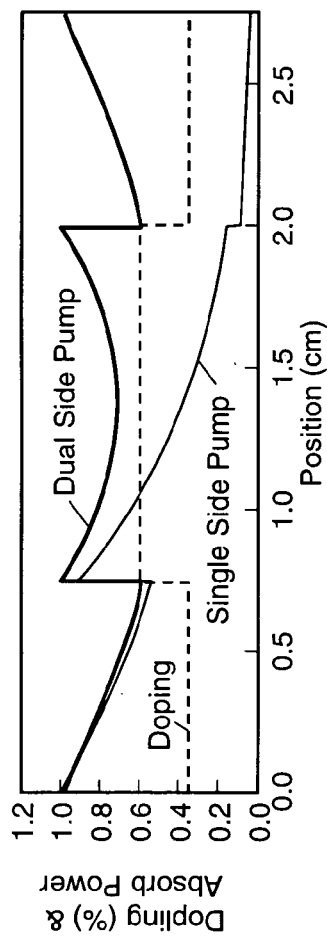
FIGS. 10A-10C are graphs similar to FIGS. 9A-9C, wherein a different dopant level is used in the central five slabs of the stack.
Figure 10B:
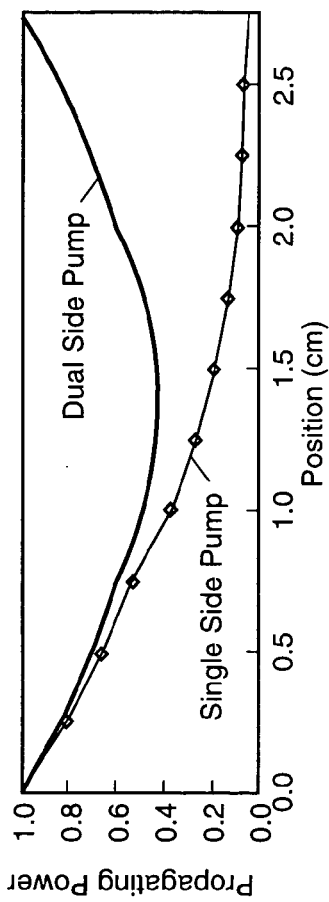
Figure 10C:
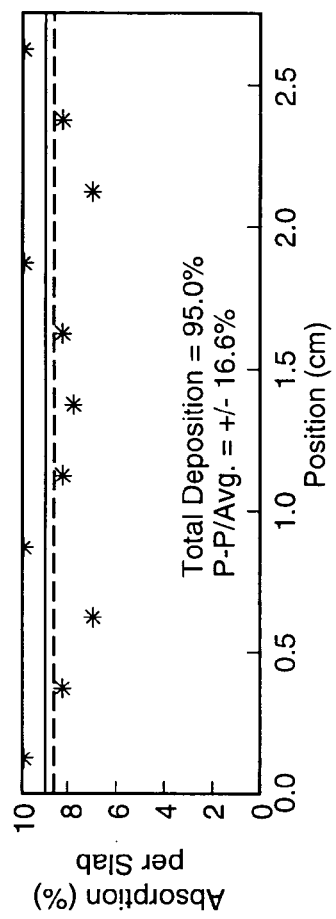

The use of two doping levels (0.35% and 0.60%), as shown in FIGS. 10A-10C, with a total absorption of 3 Nepers (95% absorption) reduces this power variation to approximately ±17%. One can virtually eliminate the power variation and obtain 98% total absorption by symmetrically varying the doping level of all eleven slabs (using six doping levels), as shown in FIGS. 11A-11C. For this design the Nd doping level varies from 0.32% in the outside slabs to 1.06% in the central slab.

Assuming that the extracted power from each beam will vary in proportion to the absorbed pump power, one can calculate the effect this pump power variation will have on the far field power distribution. For an ideal beam of 100% fill factor, the fraction of the total power that focuses into the main diffraction lobe along one dimension in the far field (i.e., the power falling within the far field angle $\pm\lambda/D$, where D is the aggregate near field beam width) is approximately 90.5%. If one assumes a power distribution (±60%) given by a single doping level as shown in FIGS. 9A-9C, then one finds the power fraction in the main lobe reduces to 79%. However, with the ±17% variation given by two doping levels (as in FIGS. 10A-10C), one finds only about 1% reduction from the ideal diffraction limited result (89.5% in main lobe). In other words, using only two doping levels provides a far field beam distribution pattern within 1% of the ideal. Therefore, using a number of doping levels greater than two provides little improvement and may not be warranted.

Figure 12:
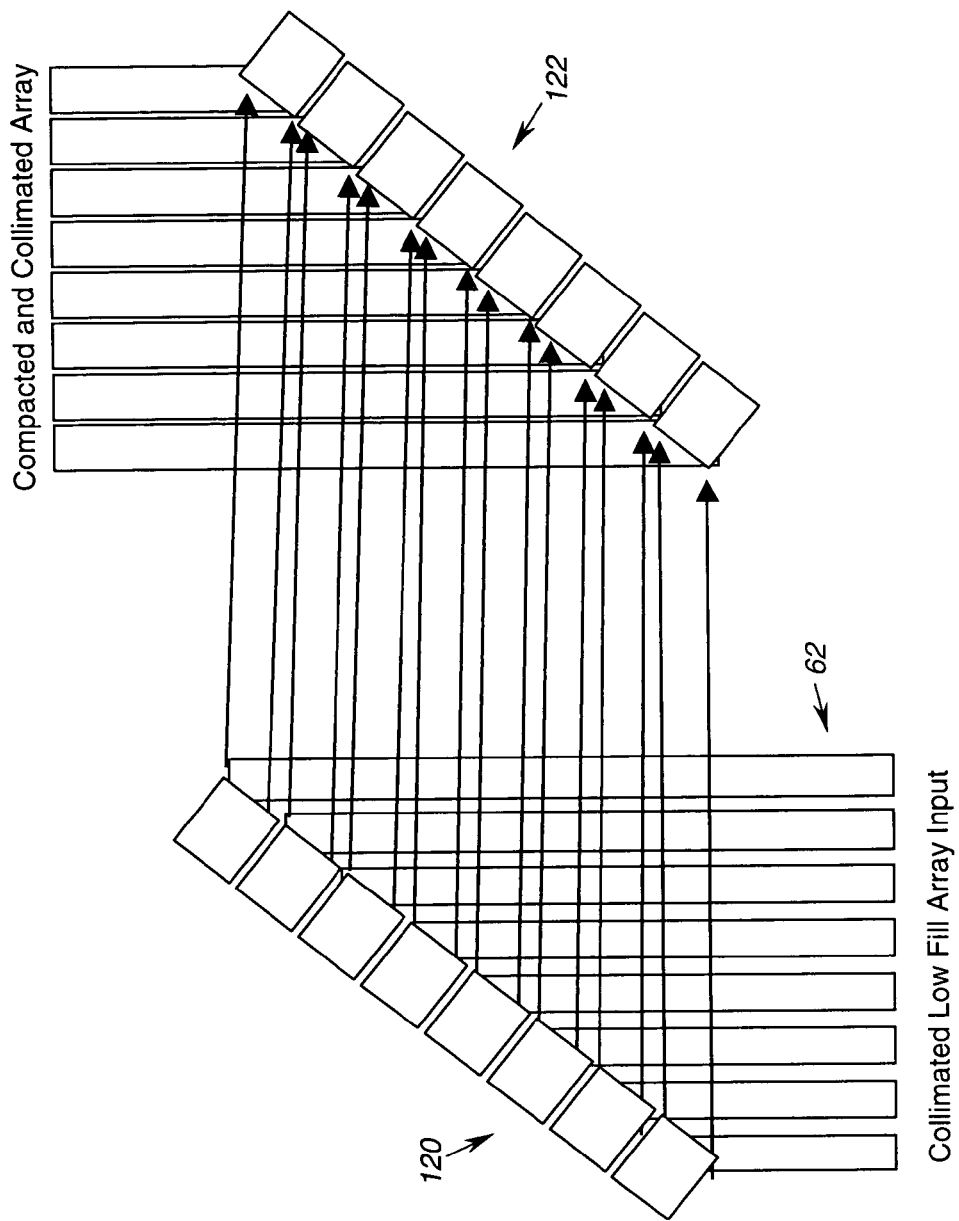
FIG. 12 depicts an arrangement of segmented mirrors configured to compact and recollimate output sub-beams.

The fill factor of the group of beamlets will also reduce the power in the main far field lobe compared to a beam of the same near field width and 100% fill. Since the fill factor of the aggregate beam is reduced by the gaps resulting from the cooling channels, it is desirable to reform the group of beamlets such that these gaps are reduced as much as possible before the final beam director. A simple scheme to accomplish this goal is to use a pair of close packed segmented mirrors, where each segment has tip/tilt adjustment and corresponds to a single beamlet. As shown in FIG. 12, a first segmented mirror 120 tilts the individual beamlets so that they propagate to form a more compact array, and at a second segmented mirror 122 the beamlets are recollimated into a more closely spaced composite output beam.

As noted above, the thermal performance of the slabs 50 in the amplifier structure of the invention improves significantly as the slab thickness is decreased. For very thin beams, diffraction effects can lead to loss of intensity modulation. Diffraction calculations show that the effect on beam intensity is tolerable (less than 1% diffraction loss) for rectangular beams in the 1.25 to 1.5 mm range. Therefore, slab thicknesses are best kept near this range, to minimize diffraction effects but still take advantage of the thermal performance obtained by using thin slabs.

Figure 13:
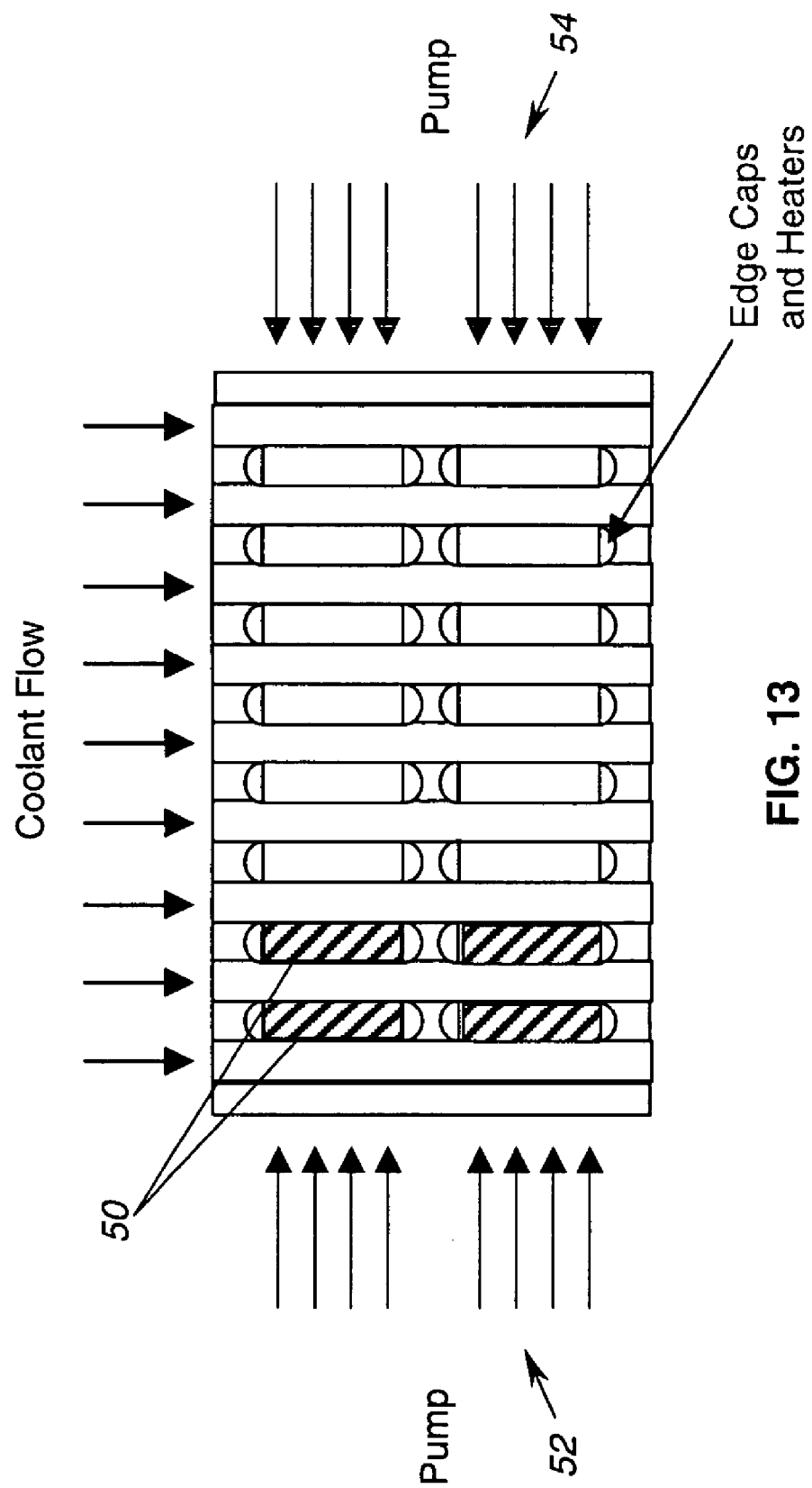
FIG. 13 is an end view depicting a two dimensional array including two stacks of solid state slabs.

The slab array concept of the invention can be extended to a two-dimensional array of slabs (and beamlets). An example of the end view of such a gain module is shown in FIG. 13. As in the one-dimensional beamlet array gain module (BAGM), heaters and edge treatment can be similarly applied to each slab 50. By way of example only, FIG. 13 shows two stacks of slabs, one on top of the other. By appropriate choice of the depth of each stack (the number of slabs) and of the number of stacks, a composite output beam of nearly symmetrical overall cross section can be obtained. Fill factor improvement can be achieved for this two-dimensional array by using a cascade of two orthogonally oriented pairs of segmented tip/tilt mirrors similar to the ones shown in FIG. 12. A two-dimensional array of slabs enables a further increase in the number of slabs within a single small aperture and scaling to an even larger total array power, while minimizing the total system size and weight of the apparatus.

It will be appreciated from the foregoing that the present invention represents a significant advance in the field of high power solid state lasers. In particular, the invention provides a solid state laser amplifier architecture that is readily scalable to very high powers. It will also be appreciated that, although specific embodiments of the invention have been illustrated and described by way of example, various modifications may be made without departing from the spirit and scope of the invention. Accordingly, the invention should not be limited except as by the appended claims.

The invention claimed is:

1. A solid-state laser amplifier architecture scalable to high output powers, comprising:
   a plurality of slabs of solid state material having parallel side faces and configured to function as zig-zag laser amplifiers, the slabs being placed together in a stack, with gaps between adjacent side faces of the slabs;
   at least one source of pump power, disposed adjacent to a side face of at least one outermost slabs in the stack, to provide laser pump power to all the slabs in the stack; and
   a common cooling system, comprising means for containing and circulating a coolant through the gaps between adjacent side faces of the slabs, and along the side faces of the outermost slabs in the stack;
   wherein each of the slabs has an input end face for receiving an input beam and an output end face through which an amplified output beam is transmitted;
   wherein the common cooling system further comprises:
   a pair of side windows positioned in a spaced relationship with the outermost slabs in stack, to form coolant passages adjacent to the outermost slabs and formed from a material that is transparent to pump power radiation from the at least one source of pump power; and means or sealing around the edges of the gaps between adjacent slabs and providing a coolant flow path extending through all the gaps.

2. A solid-state laser amplifier architecture as defined in claim 1, wherein the cooling system circulates coolant longitudinally across the side faces of the slabs, in a direction generally parallel with a light path between the end faces.

3. A solid-state laser amplifier architecture as defined in claim 1, wherein the cooling system circulates coolant transversely across the side faces of the slabs, in a direction generally perpendicular to a light path between the end faces.

4. A solid-state laser amplifier architecture as defined in claim 1, wherein each slab further comprises a longitudinal edge treatment using a material that absorbs or scatters amplified spontaneous emission (ASE) of radiation from the slab.

5. A solid-state laser amplifier architecture as defined in claim 1, wherein each slab further comprises a longitudinal edge cap shaped to induce uniform flow of coolant between adjacent slabs.

6. A solid-state laser amplifier architecture as defined in claim 1, wherein the cooling system circulates water as at least one constituent of the coolant.

7. A solid-state laser amplifier architecture as defined in claim 1, wherein the slab ski faces of each slab are coated with a film of material having an index of refraction lower than that of the slab material, the film functioning as an evanescent wave coating.

8. A solid-state laser amplifier architecture as defined in claim 1, wherein surfaces of each slab are coated with an anti-reflective material selected to minimize reflection of radiation of at least one of pump energy and laser energy.

9. A solid-state laser amplifier architecture as defined in claim 1, wherein each of the labs further comprises slab edge caps with imbedded heaters, to control slab temperature profile near the slab edges.

10. A solid-state laser amplifier architecture as defined in claim 1, wherein each of the slabs further comprises a longitudinal edge treatment using a material that reduce the effect of amplified spontaneous emission (ASE) of radiation from the slab by a process selected from absorption, diffraction and scattering.

11. A solid-state laser amplifier architecture as defined in claim 1, wherein the coolant includes an additive selected to absorb amplified spontaneous emission (ASE).

12. A solid-state laser amplifier architecture as defined in claim 1, and further comprising a thin layer of amplified spontaneous emission (ASE) absorbing material disposed within coolant passages between adjacent slabs.

13. A solid-state laser amplifier architecture as defined in claim 1, wherein the side windows is of a material selected to reduce amplified spontaneous emission (ASE) by one of absorption, diffraction and scattering.

14. A solid-state laser amplifier architecture as defined in claim 1, wherein the source of pump power includes collimating and shaping optics for appropriate focusing of the pump power into the slabs.

15. A solid-state laser amplifier architecture as defined in claim 1, wherein each of the slabs is less than approximately 3 millimeters in thickness.

16. A solid-state laser amplifier architecture scalable to high output powers, comprising:
a plurality of slabs of solid state material having parallel side faces and configured to function as zig-zag laser amplifiers, the slabs being placed together in a stack, with gaps between adjacent side faces of the slabs;
at least one source of pomp power, disposed adjacent to a side face of at least one outermost slabs in the stack, to provide laser pump power to all the slabs in the stack; and
a common cooling system, comprising means for containing and circulating a coolant through the gaps between adjacent side faces of the slabs, and along the side faces f the outermost slabs in the stack;
wherein each of the slabs has an input end face for receiving an input beam and an output and face through which an amplified output beam is transmitted; and
wherein the plurality of slabs of solid state material have dopant levels selected to compensate, in part, for diminution of pump power intensity received by slabs more distant from the source of pump power.

17. A solid-state laser amplifier architecture as defined in claim 16, wherein:
the at least one source of pump power two sources of pump power disposed on opposite sides of the stack; and
central labs furthest from the outermost slab, have a higher dopant level than the outermost slabs.

18. A solid-state laser amplifier architecture as defined in claim 17, wherein only two different dopant levels are used.

19. A solid-state laser amplifier architecture as defined in claim 16, wherein:
each slab has an optical axis extending between the input end face and the output end face in a direction parallel with the side faces; and
the input end face and the output end face of each slab are inclined at an acute angle to the optical axis, to permit the input beam to be received at the input face in a direction generally parallel with the optical axis of the slab, and to provide the output beam also in a direction generally parallel with optical axis of the slab.

20. A solid-state laser amplifier architecture as defined in claim 19, wherein the input end face and the output end face of each slab are inclined at an angle of approximately 300° the optical axis.

21. A solid-state laser amplifier architecture as defined in claim 16, wherein:
each slab has an optical axis extending between the input end face and the output end face in a direction parallel with the side faces; and
the input end face and the output end face of each slab are inclined to the optical axis at an acute angle selected to permit the input beam to be received at the input face in a direction that is not aligned with the optical axis of the slab, and to provide the output beam also in a direction generally parallel with the input beam.

22. A solid-state laser amplifier architecture scalable to high output powers, comprising:
a plurality of slabs of solid state material having parallel side faces and configured to function as zig-zag laser amplifiers, the slabs being placed together in a stack, with gaps between adjacent side faces of the slabs;
at least source of pump power, disposed adjacent to a side face of at least one outermost slabs in the stack, to provide laser pump power to all the slabs in the stack;
a common cooling system, comprising means for containing and circulating a coolant through the gaps between adjacent side faces of the slabs, and along the side faces of the outermost slabs in the stack; and a dichroic mirror or other optic positioned between the plurality of slabs and the at least one source of pump power, wherein the dichroic mirror or other optic functions to transmit pump power at a selected frequency and to reflect or effectively remove amplified spontaneous emission (ASE) of radiation from the slabs;

wherein each of the slabs has an input end face for receiving an input beam and an output end face through which an amplified output beam is transmitted.

23. A solid-state laser amplifier architecture as defined in claim 16, and further comprising:

at least additional plurality of slabs of solid state material, also having parallel side faces configured to function as zig-zag amplifiers, the additional plurality of slabs also being placed together in a stack, with gaps between adjacent side faces of the slabs;

wherein the plurality of slabs and the at least one additional plurality of slabs are placed in close proximity to form a two-dimensional array;

wherein the common cooling system provides a flow path through all the inter-slab gaps in both pluralities of slabs;

and wherein the at least one source of pump power is arrayed across outermost side faces of both pluralities of slabs.

24. solid-state laser amplifier architecture as defined in claim 1, wherein:

each slab has an optical axis extending between the input end face and the output end face is a direction parallel with the side faces; and the input end face and the output end face of each slab are inclined at an acute angle to the optical axis, to permit the input beam to be received at the input face in a direction parallel with the optical axis of the slab, and to provide the output beam also in a direction generally parallel with optical axis of the slab.

25. A solid-state laser amplifier architecture as defined in claim 24, wherein the input end face and the output end face of each slab are inclined at an angle of approximately 30° a the optical axis.

26. A solid-state laser amplifier architecture as defined in claim 1, wherein:

each slab has an optical axis extending between the input end face and the output end face in a direction parallel with the side faces; and the input end face and the output end face of each slab are inclined to the optical axis at an acute angle selected to permit the input beam to be received at the input face in a direction that is not aligned with the optical axis of the slab, and to provide the output beam also in a direction generally parallel with the input beam.

* * * * *